US012759636B2

United States Patent
(12) United States Patent
Wires et al.

(10) Patent No.: US 12,759,636 B2
(45) Date of Patent: Oct. 13, 2026

(54) LAND VEHICLES INCORPORATING FRONT AND REAR SUSPENSION ASSEMBLIES, SUSPENSION ASSEMBLIES, AND COMPONENTS THEREFOR

(71) Applicant: Workhorse Group Inc., Sharonville, OH (US)

(72) Inventors: Donald L. Wires, Loveland, OH (US); Max Lupfer, Sharonville, OH (US); Ryan Doll, Sharonville, OH (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

(21) Appl. No.: 19/393,536

(22) Filed: Nov. 18, 2025

(65) Prior Publication Data

US 2026/0249915 A1 Aug. 27, 2026

Related U.S. Application Data

(63) Continuation of application No. 19/065,993, filed on Feb. 27, 2025, now Pat. No. 12,473,029.

(51) Int. Cl.
*B62D 21/11* (2006.01)
*B60G 7/00* (2006.01)
(Continued)

(52) U.S. Cl.
CPC .............. *B62D 21/11* (2013.01); *B60G 7/008* (2013.01); *B60G 13/001* (2013.01); *B60K 1/02* (2013.01);
(Continued)

(58) Field of Classification Search
CPC ...... B62D 21/11; B60G 7/008; B60G 13/001; B60G 2200/13; B60G 2204/143; B60G 2204/148; B60G 2204/15; B60K 1/02
See application file for complete search history.

(56) References Cited

U.S. PATENT DOCUMENTS

| | | | |
|---|---|---|---|
| 1,251,749 | A | 1/1918 | Cilley |
| 1,728,889 | A | 9/1929 | Kemble |

(Continued)

FOREIGN PATENT DOCUMENTS

| | | | |
|---|---|---|---|
| CN | 103359174 | A | 10/2013 |
| CN | 109515094 | A | 3/2019 |

(Continued)

OTHER PUBLICATIONS

International Search Report; International Searching Authority; International Patent Application No. PCT/US2021/012327; Mar. 9, 2021; 2 pages.

(Continued)

*Primary Examiner* — Jacob D Knutson

(74) *Attorney, Agent, or Firm* — Taft Stettinius & Hollister LLP

(57) ABSTRACT

Land vehicles are disclosed. A land vehicle includes a chassis extending in a longitudinal direction, a plurality of wheels supported by the chassis including a pair of front wheels and a pair of rear wheels arranged rearward of the pair of front wheels in the longitudinal direction, a pair of front suspension assemblies each coupled to one of the pair of front wheels and the chassis to support the pair of front wheels for rotation relative to the chassis in use of the land vehicle, and a pair of rear suspension assemblies each coupled to one of the pair of rear wheels and the chassis to support the pair of rear wheels for rotation relative to the chassis in use of the land vehicle.

16 Claims, 19 Drawing Sheets

(51) Int. Cl.
*B60G 13/00* (2006.01)
*B60K 1/02* (2006.01)

(52) U.S. Cl.
CPC .... *B60G 2200/13* (2013.01); *B60G 2204/143* (2013.01); *B60G 2204/148* (2013.01); *B60G 2204/15* (2013.01)

(56) References Cited

U.S. PATENT DOCUMENTS

| | | | |
|---|---|---|---|
| 2,172,831 | A | 9/1939 | Philip |
| 2,728,420 | A | 12/1955 | Wright et al. |
| 2,973,220 | A | 2/1961 | White |
| 3,066,621 | A | 12/1962 | Dean et al. |
| 3,696,732 | A | 10/1972 | Rodgers |
| 4,159,832 | A | 7/1979 | Inbody |
| 4,270,622 | A | 6/1981 | Travis |
| 4,676,545 | A | 6/1987 | Bonfilio et al. |
| 4,934,733 | A | 6/1990 | Smith et al. |
| 5,168,963 | A | 12/1992 | Poncini |
| 5,363,939 | A | 11/1994 | Catlin |
| 5,363,969 | A | 11/1994 | Shen |
| 5,628,438 | A | 5/1997 | Legrow |
| 5,690,378 | A | 11/1997 | Romesburg |
| 5,823,599 | A | 10/1998 | Gray |
| 5,829,542 | A | 11/1998 | Lutz |
| 6,015,198 | A | 1/2000 | Stair |
| 6,357,769 | B1 | 3/2002 | Omundson et al. |
| 6,893,046 | B2 | 5/2005 | Ledesma et al. |
| 6,926,351 | B2 | 8/2005 | Telehowski et al. |
| 6,954,152 | B1 | 10/2005 | Matthews |
| 7,441,809 | B1 | 10/2008 | Coombs et al. |
| 7,651,153 | B2 | 1/2010 | Martin et al. |
| 8,002,063 | B2 | 8/2011 | Rydberg et al. |
| 8,641,133 | B1 | 2/2014 | Scaringe et al. |
| 8,651,292 | B2 | 2/2014 | Sunderland et al. |
| 8,714,592 | B1 | 5/2014 | Thoreson et al. |
| 9,103,535 | B1 | 8/2015 | Strobel et al. |
| 9,168,818 | B2 | 10/2015 | Hirai et al. |
| 9,550,414 | B2 | 1/2017 | Kudo et al. |
| 10,518,627 | B2 | 12/2019 | Nagpal et al. |
| 10,801,169 | B2 | 10/2020 | Roy et al. |
| 10,967,904 | B2 | 4/2021 | Penz et al. |
| 11,766,925 | B2 | 9/2023 | Landvik et al. |
| 11,801,741 | B2 | 10/2023 | Zandbergen et al. |
| 12,168,489 | B2 | 12/2024 | Choi |
| 12,466,485 | B1 | 11/2025 | Wires et al. |
| 12,472,807 | B1 | 11/2025 | Wires et al. |
| 2002/0113394 | A1 | 8/2002 | Ziech et al. |
| 2004/0046381 | A1 | 3/2004 | Yoshida et al. |
| 2004/0118643 | A1 | 6/2004 | Booher |
| 2006/0157966 | A1 * | 7/2006 | Leeve .................. B60K 17/344 280/788 |
| 2006/0158024 | A1 | 7/2006 | Wendl |
| 2006/0273571 | A1 | 12/2006 | Matsumoto et al. |
| 2007/0257570 | A1 | 11/2007 | Walter et al. |
| 2008/0003321 | A1 | 1/2008 | Kerr et al. |
| 2008/0150272 | A1 | 6/2008 | Pitsenbarger et al. |
| 2009/0032321 | A1 | 2/2009 | Marsh et al. |
| 2010/0025132 | A1 | 2/2010 | Hill et al. |
| 2010/0072787 | A1 | 3/2010 | Abe et al. |
| 2010/0101900 | A1 | 4/2010 | Usui |
| 2010/0108417 | A1 | 5/2010 | Gilmore |
| 2010/0263954 | A1 | 10/2010 | Constans |
| 2011/0017527 | A1 | 1/2011 | Oriel et al. |
| 2012/0103713 | A1 | 5/2012 | Ohashi |
| 2013/0153343 | A1 | 6/2013 | Neudeck |
| 2013/0241237 | A1 | 9/2013 | Dziuba et al. |
| 2013/0341971 | A1 | 12/2013 | Masini et al. |
| 2014/0054916 | A1 | 2/2014 | Knudtson et al. |
| 2014/0083606 | A1 | 3/2014 | Masini et al. |
| 2014/0159468 | A1 | 6/2014 | Heinen et al. |
| 2014/0182954 | A1 | 7/2014 | Weber |
| 2014/0203624 | A1 | 7/2014 | Hilton et al. |
| 2015/0027795 | A1 | 1/2015 | Hirai et al. |
| 2015/0068832 | A1 | 3/2015 | Rumpel et al. |
| 2015/0291017 | A1 | 10/2015 | LaBiche |
| 2015/0367721 | A1 | 12/2015 | Shiraki et al. |
| 2016/0106073 | A1 | 4/2016 | Van der Linde |
| 2017/0050514 | A1 | 2/2017 | Li |
| 2017/0113716 | A1 | 4/2017 | Gong et al. |
| 2017/0225715 | A1 | 8/2017 | Kobayashi et al. |
| 2017/0305253 | A1 | 10/2017 | Perle et al. |
| 2018/0037151 | A1 | 2/2018 | Bauer et al. |
| 2018/0043895 | A1 | 2/2018 | Shami et al. |
| 2018/0108891 | A1 | 4/2018 | Fees et al. |
| 2018/0237076 | A1 | 8/2018 | Perlo et al. |
| 2018/0290627 | A1 | 10/2018 | Hariri et al. |
| 2018/0337377 | A1 | 11/2018 | Stephens et al. |
| 2018/0345777 | A1 | 12/2018 | Bimschein et al. |
| 2019/0054895 | A1 | 2/2019 | Hall et al. |
| 2019/0056005 | A1 | 2/2019 | Hall et al. |
| 2019/0168678 | A1 | 6/2019 | Magnuson et al. |
| 2019/0217764 | A1 | 7/2019 | Conny |
| 2019/0389444 | A1 | 12/2019 | Kistner et al. |
| 2020/0062183 | A1 | 2/2020 | Smith et al. |
| 2020/0369140 | A1 | 11/2020 | McCarron et al. |
| 2020/0369334 | A1 | 11/2020 | Lee |
| 2021/0101641 | A1 | 4/2021 | Kim et al. |
| 2021/0171120 | A1 | 6/2021 | Kim et al. |
| 2021/0206432 | A1 | 7/2021 | Willison |
| 2022/0041244 | A1 | 2/2022 | Upadhyay et al. |
| 2022/0123397 | A1 | 4/2022 | Weicker et al. |
| 2022/0410975 | A1 | 12/2022 | Eklund et al. |
| 2023/0062143 | A1 | 3/2023 | Zandbergen et al. |
| 2023/0070279 | A1 | 3/2023 | Wheeler et al. |
| 2023/0130254 | A1 | 4/2023 | Gonzalez et al. |
| 2024/0278843 | A1 | 8/2024 | Nagasawa |

FOREIGN PATENT DOCUMENTS

| | | | | | |
|---|---|---|---|---|---|
| CN | 110884568 | A | | 3/2020 | |
| CN | 116901633 | A | * | 10/2023 | ............. B60G 11/16 |
| DE | 19626901 | A1 | | 1/1998 | |
| DE | 102012101483 | A1 | | 6/2013 | |
| DE | 102015200737 | B4 | | 6/2020 | |
| DE | 102019109465 | A1 | | 10/2020 | |
| EP | 1538072 | A1 | | 6/2005 | |
| EP | 2105328 | A2 | * | 9/2009 | ............... B60G 7/02 |
| EP | 2552763 | A2 | | 2/2013 | |
| EP | 3174680 | A2 | | 6/2017 | |
| EP | 3689717 | A1 | | 8/2020 | |
| FR | 2698601 | A1 | | 6/1994 | |
| GB | 2479898 | A | | 11/2011 | |
| WO | 02053447 | A2 | | 7/2002 | |
| WO | 2016016662 | A2 | | 2/2016 | |

OTHER PUBLICATIONS

Written Opinion of the International Searching Authority; International Searching Authority; International Patent Application No. PCT/US2021/012327; Mar. 9, 2021; 8 pages.

International Search Report; International Searching Authority; International Patent Application No. PCT/US2021/012330; Mar. 9, 2021; 2 pages.

Written Opinion of the International Searching Authority; International Searching Authority; International Patent Application No. PCT/US2021/012330; Mar. 9, 2021; 9 pages.

International Search Report; International Searching Authority; International Patent Application No. PCT/US2021/012332; Mar. 24, 2021; 2 pages.

Written Opinion of the International Searching Authority; International Searching Authority; International Patent Application No. PCT/US2021/012332; Mar. 24, 2021; 7 pages.

Supplementary European Search Report; European Patent Office; European Application No. 21710384.5; Oct. 21, 2021; 12 pages.

International Search Report; International Searching Authority; International Patent Application No. PCT/US2022/014847; Mar. 8, 2022; 3 pages.

Written Opinion of the International Searching Authority; International Searching Authority; International Patent Application No. PCT/US2022/014847; Mar. 8, 2022; 6 pages.

(56) References Cited

OTHER PUBLICATIONS

International Search Report; International Searching Authority; International Patent Application No. PCT/US2022/014844; Mar. 16, 2022; 2 pages.
Written Opinion of the International Searching Authority; International Searching Authority; International Patent Application No. PCT/US2022/014844; Mar. 16, 2022; 7 pages.
International Search Report; International Searching Authority; International Patent Application No. PCT/US2022/014851; Apr. 25, 2022; 2 pages.
Written Opinion of the International Searching Authority; International Searching Authority; International Patent Application No. PCT/US2022/014851; Apr. 25, 2022; 7 pages.
International Search Report; International Searching Authority; International Patent Application No. PCT/US2022/014852; Apr. 18, 2022; 2 pages.
Written Opinion of the International Searching Authority; International Searching Authority; International Patent Application No. PCT/US2022/014852; Apr. 18, 2022; 7 pages.
Extended European Search Report; European Patent Office; European Patent Application No. 22153661.8; Jul. 6, 2022; 11 pages.
Partial European Search Report (R. 64 EPC); European Patent Office; European Patent Application No. 22153665.9; Aug. 18, 2022; 16 pages.
International Search Report; International Searching Authority; International Patent Application No. PCT/US2025/058420; Feb. 26, 2026; 2 pages.
Written Opinion of the International Searching Authority; International Searching Authority; International Patent Application No. PCT/US2025/058420; Feb. 26, 2026; 8 pages.
International Search Report; International Searching Authority; International Patent Application No. PCT/US2025/058415; Feb. 13, 2026; 3 pages.
Written Opinion of the International Searching Authority; International Searching Authority; International Patent Application No. PCT/US2025/058415; Feb. 13, 2026; 13 pages.
Invitation to Pay Additional Fees; International Searching Authority; International Patent Application No. PCT/US2025/058409; Feb. 19, 2026; 2 pages.
International Search Report; International Searching Authority; International Patent Application No. PCT/US2025/058408; Apr. 10, 2026; 3 pages.
Written Opinion of the International Searching Authority; International Searching Authority; International Patent Application No. PCT/US2025/058408; Apr. 10, 2026; 16 pages.
International Search Report; International Searching Authority; International Patent Application No. PCT/US2025/058409; Apr. 15, 2026; 4 pages.
Written Opinion of the International Searching Authority; International Searching Authority; International Patent Application No. PCT/US2025/058409; Apr. 15, 2026; 15 pages.

* cited by examiner

LAND VEHICLES INCORPORATING FRONT AND REAR SUSPENSION ASSEMBLIES, SUSPENSION ASSEMBLIES, AND COMPONENTS THEREFOR

CROSS-REFERENCE TO RELATED APPLICATIONS

This application is a continuing application of, and claims priority to, U.S. application Ser. No. 19/065,993, which was filed on Feb. 27, 2025. The contents of that application are incorporated herein by reference in their entirety.

TECHNICAL FIELD

The present disclosure generally relates to land vehicles adapted for use in delivery applications, and, more particularly, to electric delivery and utility vehicles.

BACKGROUND

Land vehicles adapted for use in delivery applications may have various shortcomings. In particular, electrically-powered delivery and utility vehicles may have certain drawbacks. For those reasons, among others, electrically-powered land vehicles suited for use in delivery applications that avoid the limitations of conventional components and/or systems remain an area of interest.

SUMMARY

The present disclosure may comprise one or more of the following features and combinations thereof.

According to one aspect of the present disclosure, a land vehicle may include a chassis extending in a longitudinal direction, a plurality of wheels supported by the chassis, a pair of front suspension assemblies each coupled to one of the pair of front wheels and the chassis, and a pair of rear suspension assemblies each coupled to one of the pair of rear wheels and the chassis. The plurality of wheels may include a pair of front wheels and a pair of rear wheels arranged rearward of the pair of front wheels in the longitudinal direction. The pair of front suspension assemblies may support the pair of front wheels for rotation relative to the chassis in use of the land vehicle. The pair of rear suspension assemblies may support the pair of rear wheels for rotation relative to the chassis in use of the land vehicle. At least one section of the chassis may include a pair of base rails spaced from one another in a lateral direction perpendicular to the longitudinal direction. One front suspension assembly may be mounted to one of the pair of base rails such that the one front suspension assembly is arranged outward of the one of the pair of base rails in the lateral direction. The other front suspension assembly may be mounted to the other of the pair of base rails such that the other front suspension assembly is arranged outward of the other of the pair of base rails in the lateral direction.

In some embodiments, the chassis may include a front suspension subframe assembly supporting the pair of front wheels, and the front suspension subframe assembly may include a base rail assembly including the pair of base rails.

In some embodiments, the front suspension subframe assembly may include a drive unit cradle at least partially housing a plurality of drive units of the vehicle that are coupled to the pair of front wheels and a base block coupled to the drive unit cradle and arranged rearward of the drive unit cradle in the longitudinal direction, and the drive unit cradle and the base block may be mounted to the base rail assembly.

In some embodiments, the one front suspension assembly may include a mount plate directly coupled to the one of the pair of base rails such that the mount plate is aligned with the drive unit cradle in the longitudinal direction, and the mount plate may include a planar exterior face.

In some embodiments, the one front suspension assembly may include a mount structure having a planar mount face in direct contact with the planar exterior face of the mount plate.

In some embodiments, the one front suspension assembly may include a swing arm assembly movably coupled to the mount structure, the swing arm assembly may include a disc on which one of the pair of front wheels is rotatably mounted, and the one front suspension assembly may include at least one shock absorber movably coupled to the swing arm assembly and the mount structure.

In some embodiments, the chassis may include a rear suspension subframe assembly supporting the pair of rear wheels, and the rear suspension subframe assembly may include a base plate, a first frame arch coupled to the base plate at one lateral end thereof, and a second frame arch coupled to the base plate at another lateral end thereof opposite the one lateral end.

In some embodiments, the base plate may be formed to include a central cavity in which a plurality of drive units of the vehicle that are coupled to the pair of rear wheels is at least partially positioned.

In some embodiments, one rear suspension assembly may be mounted to the rear suspension subframe assembly adjacent the first frame arch such that the one rear suspension assembly is arranged at least partially inward of the first frame arch in the lateral direction, and the other rear suspension assembly may be mounted to the rear suspension subframe assembly adjacent the second frame arch such that the other rear suspension assembly is arranged at least partially inward of the second frame arch in the lateral direction.

In some embodiments, the one rear suspension assembly may include a swing arm assembly movably coupled to the rear suspension subframe assembly, the swing arm assembly may include a disc on which one of the pair of rear wheels is rotatably mounted, the one rear suspension assembly may include at least one shock absorber movably coupled to the swing arm assembly and the rear suspension subframe assembly, and the at least one shock absorber of the one rear suspension assembly may be arranged inward of the first frame arch in the lateral direction.

In some embodiments, the other rear suspension assembly may include a swing arm assembly movably coupled to the rear suspension subframe assembly, the swing arm assembly may include a disc on which the other of the pair of rear wheels is rotatably mounted, the other rear suspension assembly may include at least one shock absorber movably coupled to the swing arm assembly and the rear suspension subframe assembly, and the at least one shock absorber of the other rear suspension assembly may be arranged inward of the second frame arch in the lateral direction.

According to another aspect of the present disclosure, a land vehicle may include a chassis extending in a longitudinal direction that includes a front suspension subframe assembly, a pair of front wheels supported by the front suspension subframe assembly, and a pair of front suspension assemblies each coupled to one of the pair of front wheels and the front suspension subframe to support the pair of front wheels for rotation relative to the chassis in use of the land vehicle. The front suspension subframe assembly may include a pair of base rails spaced from one another in a lateral direction perpendicular to the longitudinal direction. One front suspension assembly may be mounted to one of the pair of base rails such that the one front suspension assembly is arranged outward of the one of the pair of base rails in the lateral direction. The other front suspension assembly may be mounted to the other of the pair of base rails such that the other front suspension assembly is arranged outward of the other of the pair of base rails in the lateral direction.

In some embodiments, the front suspension subframe assembly may include a drive unit cradle at least partially housing a plurality of drive units of the vehicle that are coupled to the pair of front wheels, and the drive unit cradle may be mounted to the base rail assembly.

In some embodiments, the one front suspension assembly may include a mount plate directly coupled to the one of the pair of base rails such that the mount plate is aligned with the drive unit cradle in the longitudinal direction.

In some embodiments, the one front suspension assembly may include a mount structure having a planar mount face in direct contact with a planar exterior face of the mount plate.

In some embodiments, the one front suspension assembly may include a swing arm assembly movably coupled to the mount structure, the swing arm assembly may include a disc on which one of the pair of front wheels is rotatably mounted, and the one front suspension assembly may include at least one shock absorber movably coupled to the swing arm assembly and the mount structure.

In some embodiments, the mount structure, the swing arm assembly, and the at least one shock absorber may be arranged outward of the one of the pair of base rails in the lateral direction.

According to yet another aspect of the present disclosure, a land vehicle may include a chassis extending in a longitudinal direction that includes a rear suspension subframe assembly, a pair of rear wheels supported by the rear suspension subframe assembly, and a pair of rear suspension assemblies each coupled to one of the pair of rear wheels and the rear suspension subframe assembly to support the pair of rear wheels for rotation relative to the chassis in use of the land vehicle. The rear suspension subframe assembly may include a base plate, a first frame arch coupled to the base plate at one lateral end thereof, and a second frame arch coupled to the base plate at another lateral end thereof opposite the one lateral end. One rear suspension assembly may be mounted to the rear suspension subframe assembly adjacent the first frame arch such that the one rear suspension assembly is arranged at least partially inward of the first frame arch in a lateral direction perpendicular to the longitudinal direction. The other rear suspension assembly may be mounted to the rear suspension subframe assembly adjacent the second frame arch such that the other rear suspension assembly is arranged at least partially inward of the second frame arch in the lateral direction.

In some embodiments, the one rear suspension assembly may include a swing arm assembly movably coupled to the rear suspension subframe assembly, the swing arm assembly may include a disc on which one of the pair of rear wheels is rotatably mounted, the one rear suspension assembly may include at least one shock absorber movably coupled to the swing arm assembly and the rear suspension subframe assembly, and the at least one shock absorber of the one rear suspension assembly may be arranged inward of the first frame arch in the lateral direction.

In some embodiments, the other rear suspension assembly may include a swing arm assembly movably coupled to the rear suspension subframe assembly, the swing arm assembly may include a disc on which the other of the pair of rear wheels is rotatably mounted, the other rear suspension assembly may include at least one shock absorber movably coupled to the swing arm assembly and the rear suspension subframe assembly, and the at least one shock absorber of the other rear suspension assembly may be arranged inward of the second frame arch in the lateral direction.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF ILLUSTRATIVE EMBODIMENTS

Figure 1:
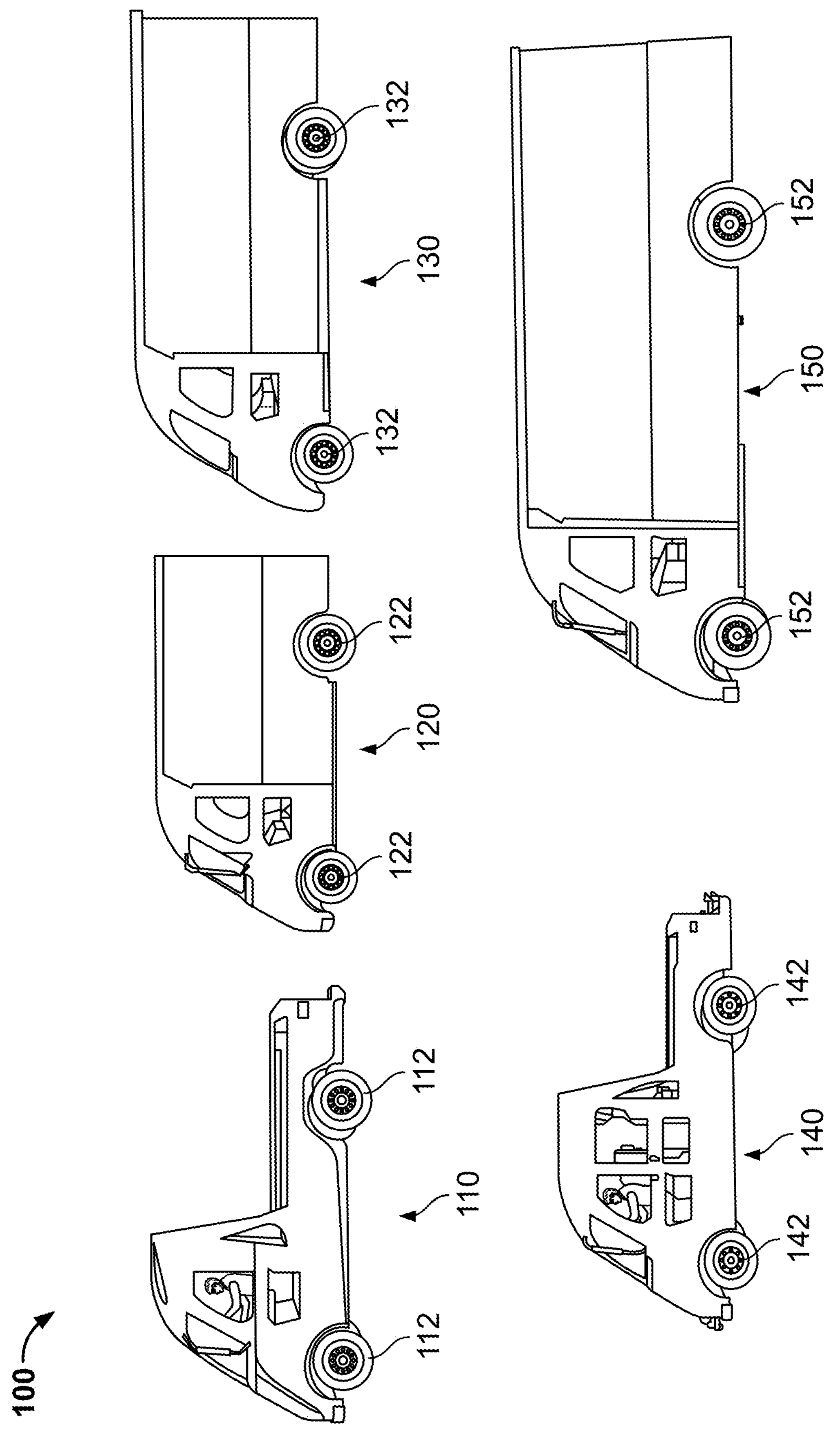
FIG. 1 depicts side elevation views of a number of electric vehicles that may incorporate powertrain assemblies according to certain embodiments of the disclosure.
Figure 2:
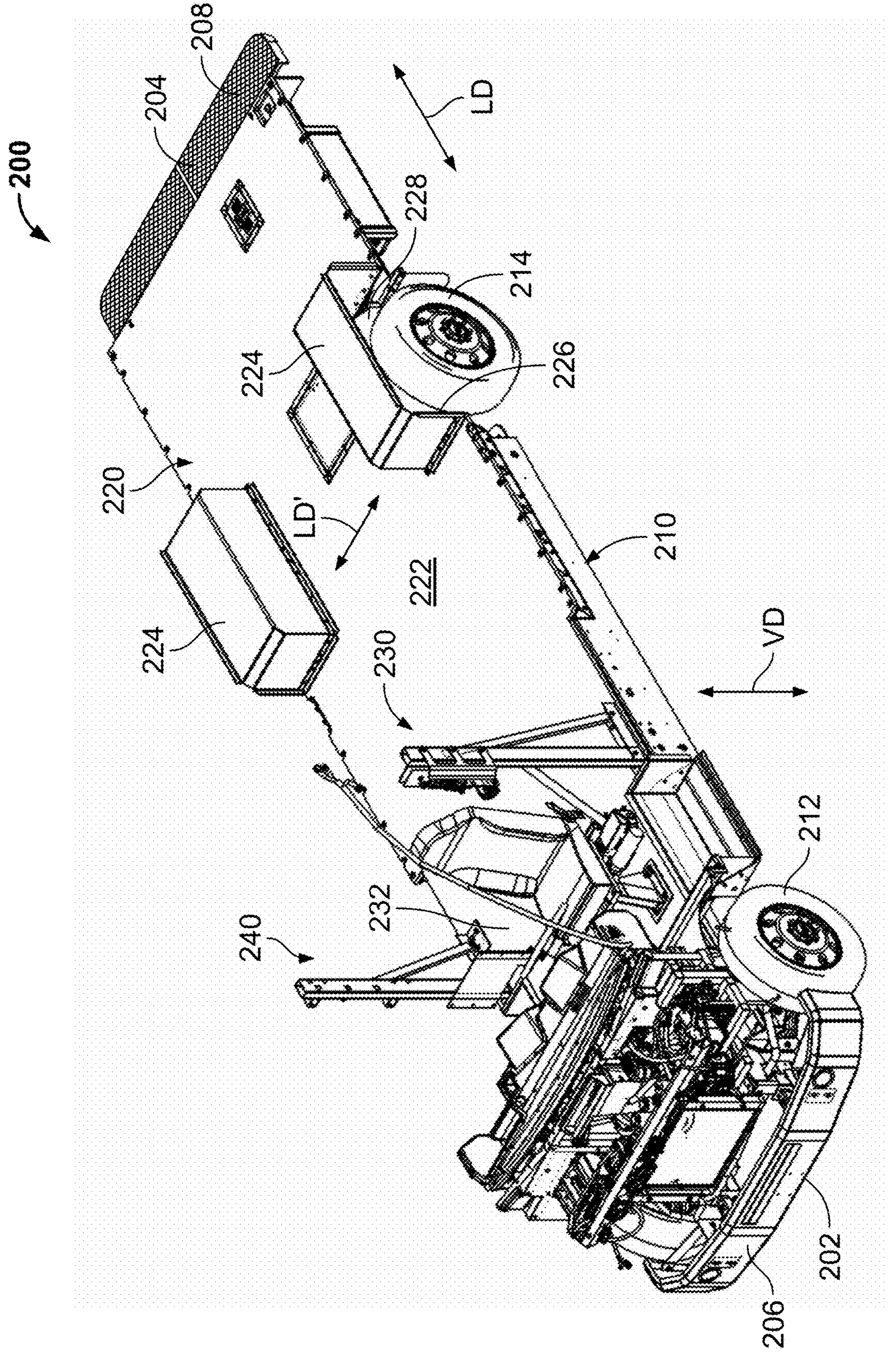
FIG. 2 is a perspective view of a vehicle chassis at least partially obscured by a vehicle floor and adapted for inclusion in one or more of the electric vehicles of FIG. 1 according to certain embodiments of the disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative line 100 of land vehicles includes a plurality of land vehicles. In the illustrative embodiment, the land vehicle line 100 includes, but is not limited to, a two-passenger flatbed utility vehicle 110 having wheels 112, a 650 cubic foot capacity delivery vehicle 120 having wheels 122, a 1000 cubic foot capacity delivery vehicle 130 having wheels 132, a six-passenger flatbed utility vehicle 140 having wheels 142, and a 1200 cubic foot capacity delivery vehicle 150 having wheels 152. In some embodiments, the land vehicle line 100 may be similar to the vehicle line 100 discussed in U.S. Pat. No.

11,400,982, which issued on Aug. 2, 2022, and which is incorporated by reference herein in its entirety. However, in some embodiments, the land vehicle line 100 may include any vehicle having a capacity within a particular range, such as a range of from 400 cubic feet to 1400 cubic feet, for example. Additionally, in some embodiments, the land vehicle line 100 may include a vehicle similar to the vehicle 100 discussed in U.S. Pat. No. 11,440,456, which issued on Sep. 13, 2022, and which is incorporated by reference herein in its entirety.

Referring now to FIG. 2 and FIGS. 3A-3C, an illustrative land vehicle 200 may be included in the line 100. In one example, the vehicle 200 may be similar to the delivery vehicle 150. The vehicle 200 is depicted with various external structures (e.g., a body having sidewalls, a rear compartment, a roof) omitted to better visualize a multi-segment chassis or main frame 210 thereof, among other things. In the illustrative arrangement, the chassis 210 is at least partially covered by a floor assembly 220 such that the chassis 210 and the floor assembly 220 extend in a longitudinal direction LD between a front end 202 of the vehicle 200 and a rear end 204 of the vehicle 200. The front end 202 includes a front bumper 206 and the rear end 204 includes a rear bumper 208, and each of the bumpers 206, 208 is coupled to, and supported by, the chassis 210.

The vehicle 200 illustratively includes a pair of front wheels 212 and a pair of rear wheels 214 supported by the chassis 210. The rear wheels 214 are arranged rearward of the front wheels 212 in the longitudinal direction LD. The illustrative floor assembly 220 includes a main floor body 222 and a pair of tire enclosure blocks 224 coupled to the main floor body 222 such that each of the tire enclosure blocks 224 extends above the main floor body 222 in a vertical direction VD. Each of the tire enclosure blocks 224 is sized to at least partially cover and enclose one of the rear wheels 214. In some embodiments, the floor assembly 220 does not include enclosure blocks or similar structures for the front wheels 212.

In the illustrative embodiment, the main floor body 222 is formed to include cutouts 226 extending inwardly therethrough in a lateral direction LD' perpendicular to the longitudinal direction LD. The cutouts 226 are illustratively aligned with the tire enclosure blocks 224 in the longitudinal direction LD and the lateral direction LD' such that the tire enclosure blocks 224 extend above and overhang the cutouts 226. When the rear wheels 214 are supported by the chassis 210 and the chassis 210 is covered and overlaid by the floor assembly 220, the cutouts 226 and the pair of tire enclosure blocks 224 cooperatively define wells 228 in which each one of the rear wheels 214 is disposed. Each of the wells 228 is sized to ensure spatial clearance between the tire mounted to a corresponding one of the rear wheels 214 and the corresponding enclosure block 224 covering the tire.

In the illustrative embodiment, the vehicle 200 includes a seatbelt tower assembly 230 supported by the chassis 210 and the floor assembly 220. The illustrative seatbelt tower assembly 230 is configured to secure a seatbelt (not shown) for an operator in an operator cabin 232. In some embodiments, the seatbelt tower assembly 230 may be similar to the seatbelt tower assembly 720 discussed in co-pending U.S. application Ser. No. 18/829,761, which was filed on Sep. 10, 2024, and which is incorporated by reference herein in its entirety.

In the illustrative embodiment, the vehicle 200 includes a seat frame assembly 240 supported by the chassis 210 and the floor assembly 220 that is configured to support a seat (not shown) for a passenger in the operator cabin 232. The seat frame assembly 240 is spaced from the seatbelt tower assembly 230 in the lateral direction LD' and aligned with the seatbelt tower assembly 230 in the longitudinal direction LD. In some embodiments, the seat frame assembly 240 may be similar to the seat frame assembly 730 discussed in co-pending U.S. application Ser. No. 18/829,761.

The multi-segment chassis 210 illustratively includes a front suspension subframe assembly 310 (see FIG. 3A) that supports the pair of front wheels 212, a rear suspension subframe assembly 330 that supports the pair of rear wheels 214, a power source cradle assembly 350 arranged between the front suspension subframe assembly 310 and the rear suspension subframe assembly 330 in the longitudinal direction LD, a midframe assembly 370 arranged at least partially between the front suspension subframe assembly 310 and at least a portion of the power source cradle assembly 350 in the longitudinal direction LD, and an electronics cradle assembly 390 arranged rearward of the rear suspension subframe assembly 330 in the longitudinal direction LD. As discussed below, the power source cradle assembly 350 is configured to support one or more electrical power sources 352 (e.g., battery packs) that may be used to supply power to one or more electric motors or drive units of the vehicle 200. Further, as discussed below, the electronics cradle assembly 390 is configured to support one or more electronic devices (not shown) distinct from the power sources 352. Further still, as discussed below, the power source cradle assembly 350 and the midframe assembly 370 cooperatively establish an enclosure 608 (see FIG. 6) in which the power sources 352 are at least partially enclosed in use of the vehicle 200.

In the illustrative embodiment, the vehicle 200 includes a pair of front suspension assemblies or systems 320A, 320B each coupled to one of the pair of front wheels 212 and the chassis 210 to support the pair of front wheels 212 for rotation relative to the chassis 210 in use of the vehicle 200. Additionally, the illustrative vehicle 200 includes a pair of rear suspension assemblies or systems 340A, 340B each coupled to one of the pair of rear wheels 214 and the chassis 210 to support the pair of rear wheels 214 for rotation relative to the chassis 210 in use of the vehicle 200. In some embodiments, the front suspension assemblies 320A, 320B may be identical or substantially similar to one another, and the rear suspension assemblies 340A, 340B may be identical or substantially similar to one another. Further, in some embodiments, the front suspension assemblies 320A, 320B may be different and/or structurally distinguishable from the rear suspension assemblies 340A, 340B.

Figure 5:
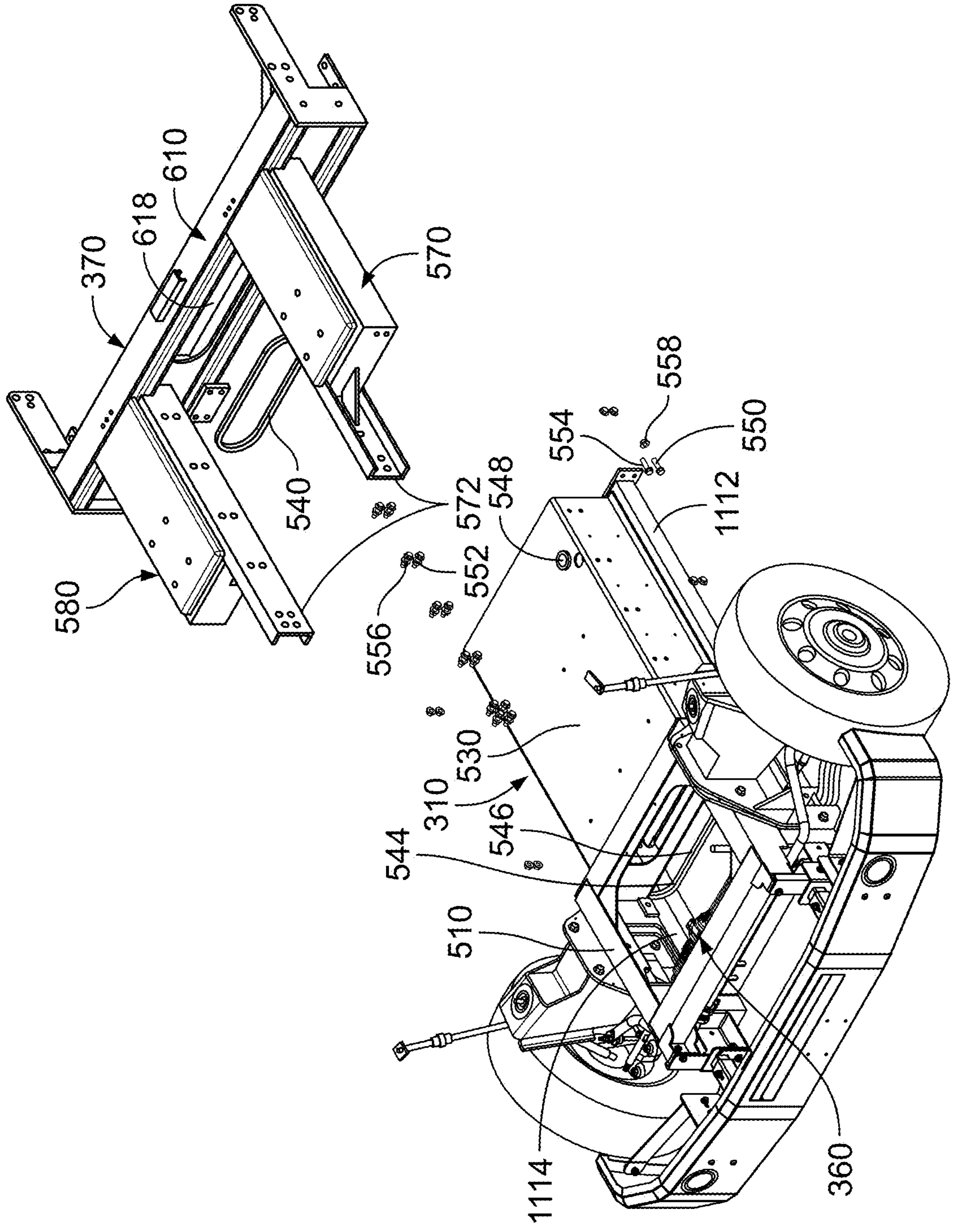
FIG. 5 is a perspective view of part of the chassis of FIG. 3A with certain features omitted for the sake of clarity that illustrates a pair of front suspension assemblies mounted to a front suspension subframe assembly of the chassis and a midframe assembly coupled to the front suspension subframe assembly.
Figure 10:
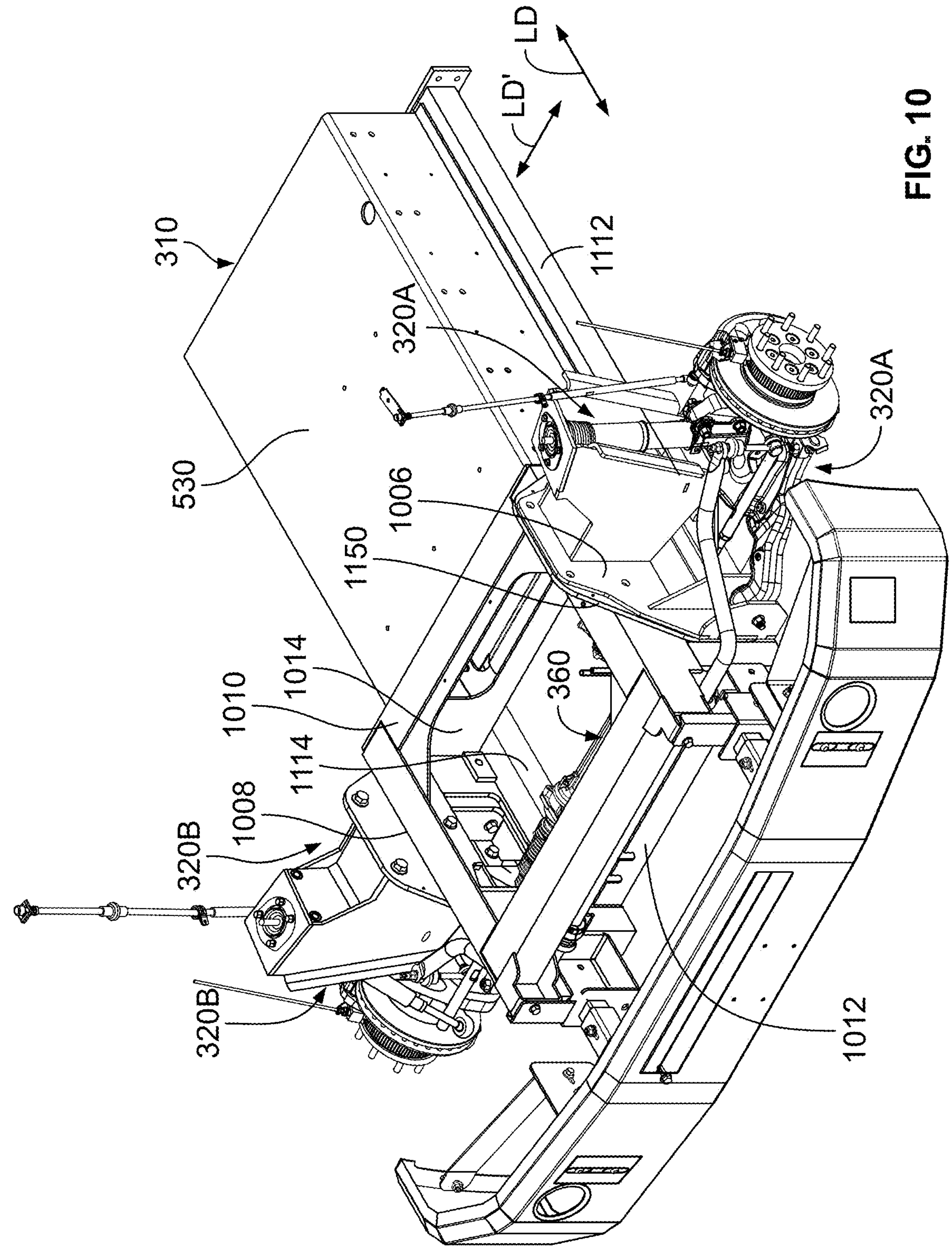
FIG. 10 is a perspective view of part of the chassis similar to FIG. 5A showing the pair of front suspension assemblies mounted to the front suspension subframe assembly with the midframe assembly omitted for the sake of clarity.
Figure 11:
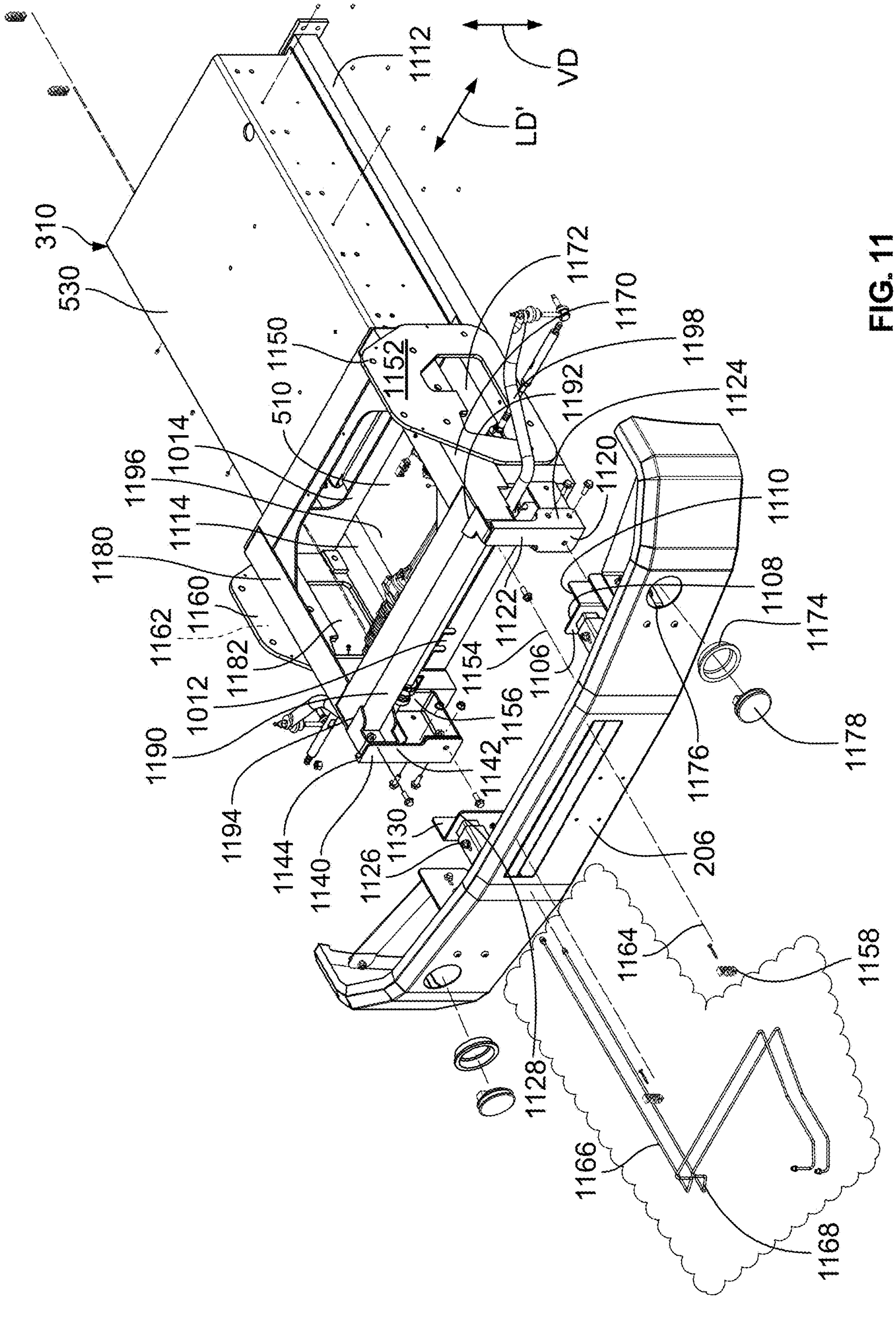
FIG. 11 is a partially exploded perspective view of the part of the chassis shown in FIG. 10 depicting the front suspension subframe assembly and a front bumper mounted thereto with the pair of front suspension assemblies omitted for the sake of clarity.
Figure 13:
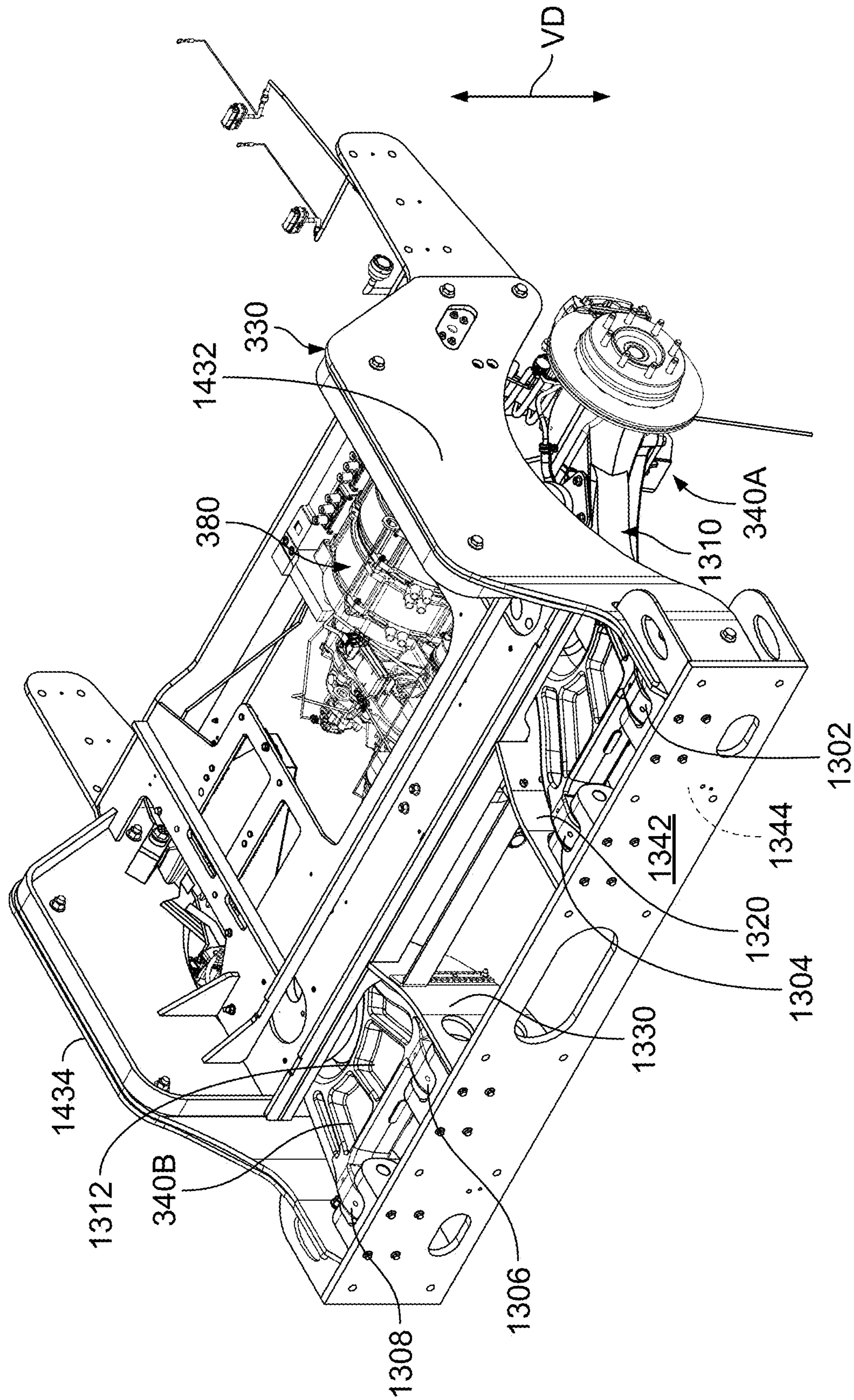
FIG. 13 is a perspective view of part of the chassis similar to FIG. 7 showing the rear suspension subframe assembly with the pair of rear suspension assemblies mounted thereto and the rear crossbeam assembly and the electronic cradle assembly omitted for the sake of clarity.
Figure 14:
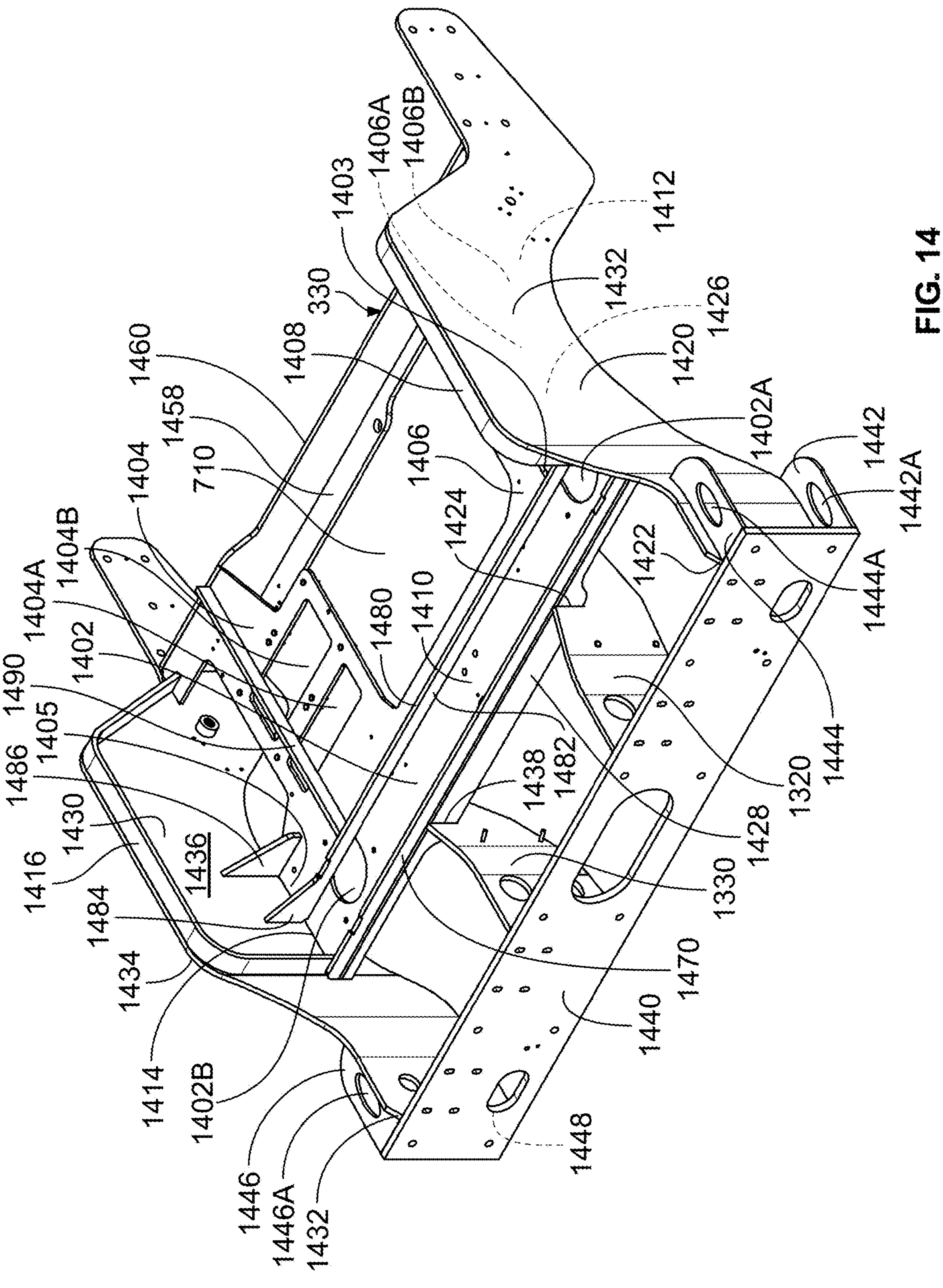
FIG. 14 is a perspective view similar to FIG. 13 of the rear suspension subframe assembly with the pair of rear suspension assemblies omitted for the sake of clarity.
Figure 17:
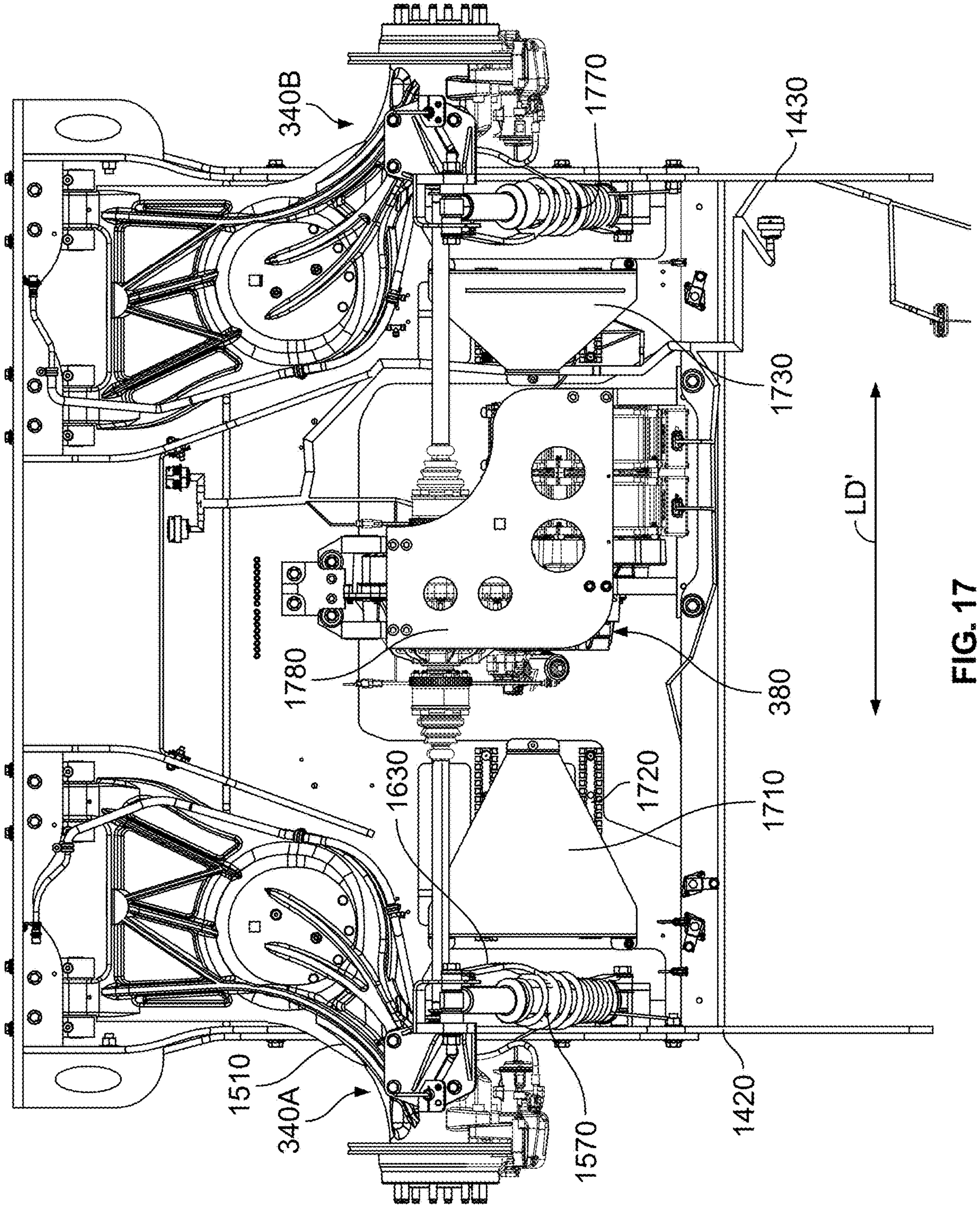
FIG. 17 is a bottom view of the part of the chassis shown in FIG. 13 depicting the rear suspension subframe assembly, the pair of rear suspension assemblies, and a rear powertrain unit of the vehicle.

In the illustrative embodiment, the vehicle 200 includes a powertrain unit 360 that is supported by the front suspension subframe assembly 310 and coupled to the front wheels 212. Additionally, the vehicle 200 includes a powertrain unit 380 that is supported by the rear suspension subframe assembly 330 and coupled to the rear wheels 214. As shown in FIGS. 5, 10, and 11, the powertrain unit 360 extends in the lateral direction LD' through opposite sides 1006, 1008 (see FIG. 10) of a cage 1010 of the front suspension subframe assembly 310 such that the powertrain unit 360 is at least partially surrounded by the front suspension subframe assembly 310 at the sides 1006, 1008 of the cage 1010. As shown in FIGS. 13, 14, and 17 the powertrain unit 380 is arranged beneath opposite sides 1432, 1434 of the rear suspension subframe assembly 330 in the vertical direction VD without being surrounded by the opposite sides 1432, 1434.

Figure 3A:
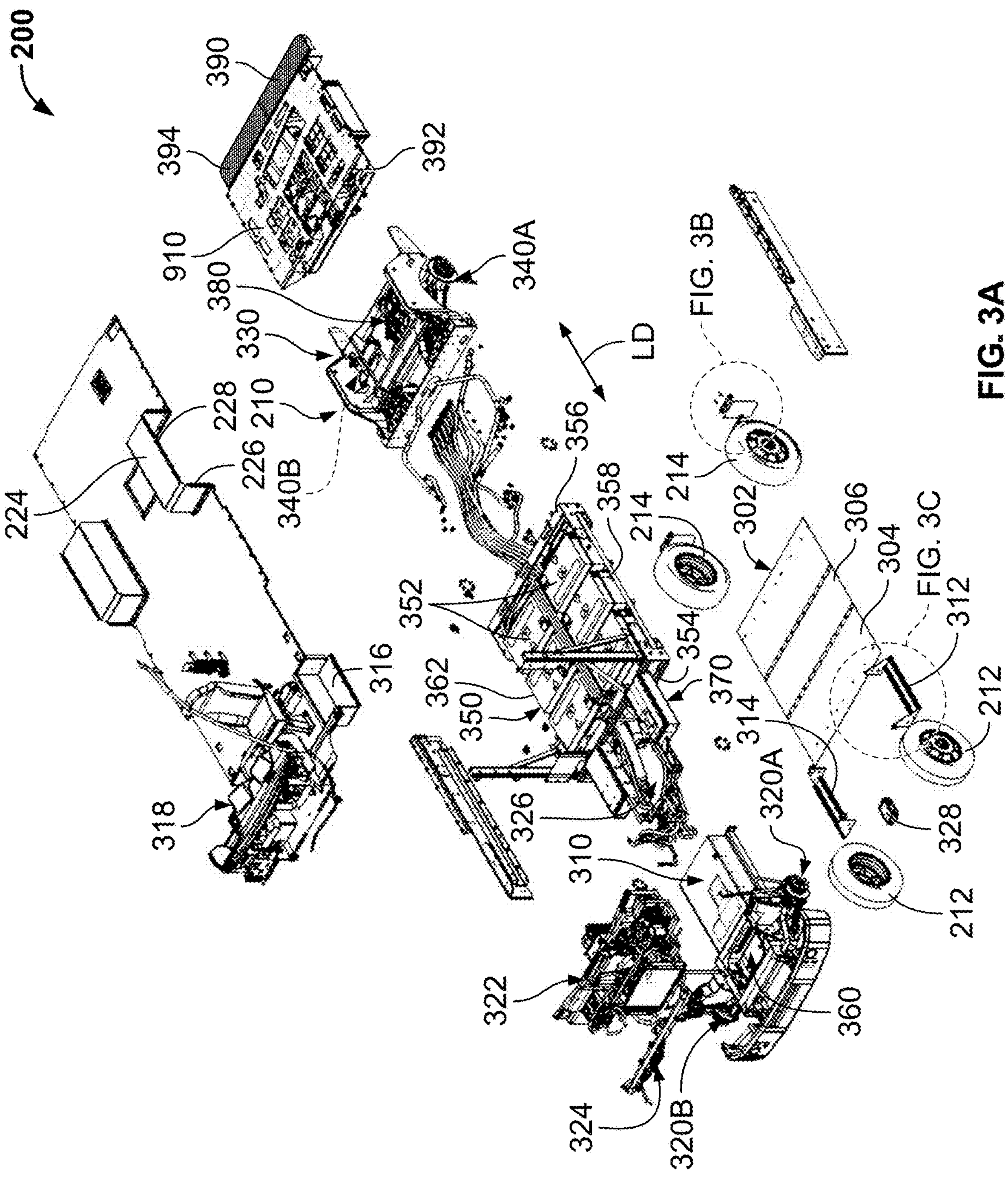
FIG. 3A is a partially exploded perspective view of the vehicle chassis of FIG. 2 depicting various sections or segments of the chassis arranged along a longitudinal axis.

The illustrative front suspension subframe assembly 310 of the chassis 210 includes base rails 1112, 1114 (see FIG. 11) that are spaced from one another in the lateral direction LD'. As shown in FIGS. 3A, 5, and 10, the front suspension assembly 320A is mounted to the base rail 1112 such that the front suspension assembly 320A is arranged outward of the base rail 1112 in the lateral direction LD'. Additionally, the front suspension assembly 320B is mounted to the base rail 1114 such that the front suspension assembly 320B is arranged outward of the base rail 1114 in the lateral direction LD'.

The illustrative rear suspension subframe assembly 330 of the chassis 210 includes a base plate 1410 (see FIG. 14), one frame arch 1420 coupled to the base plate 1410 at one lateral end 1412 thereof that defines the side 1432, and another frame arch 1430 coupled to the base plate 1410 at another lateral end 1414 thereof opposite the end 1412 that defines the side 1434. The rear suspension assembly 340A is mounted to the rear suspension subframe assembly 330 adjacent the frame arch 1420 such that the rear suspension assembly 340A is arranged at least partially inward of the frame arch 1420 in the lateral direction LD'. The rear suspension assembly 340B is mounted to the rear suspension subframe assembly 330 adjacent the frame arch 1430 such that the rear suspension assembly 340B is arranged at least partially inward of the frame arch 1430 in the lateral direction LD'.

Figure 9:
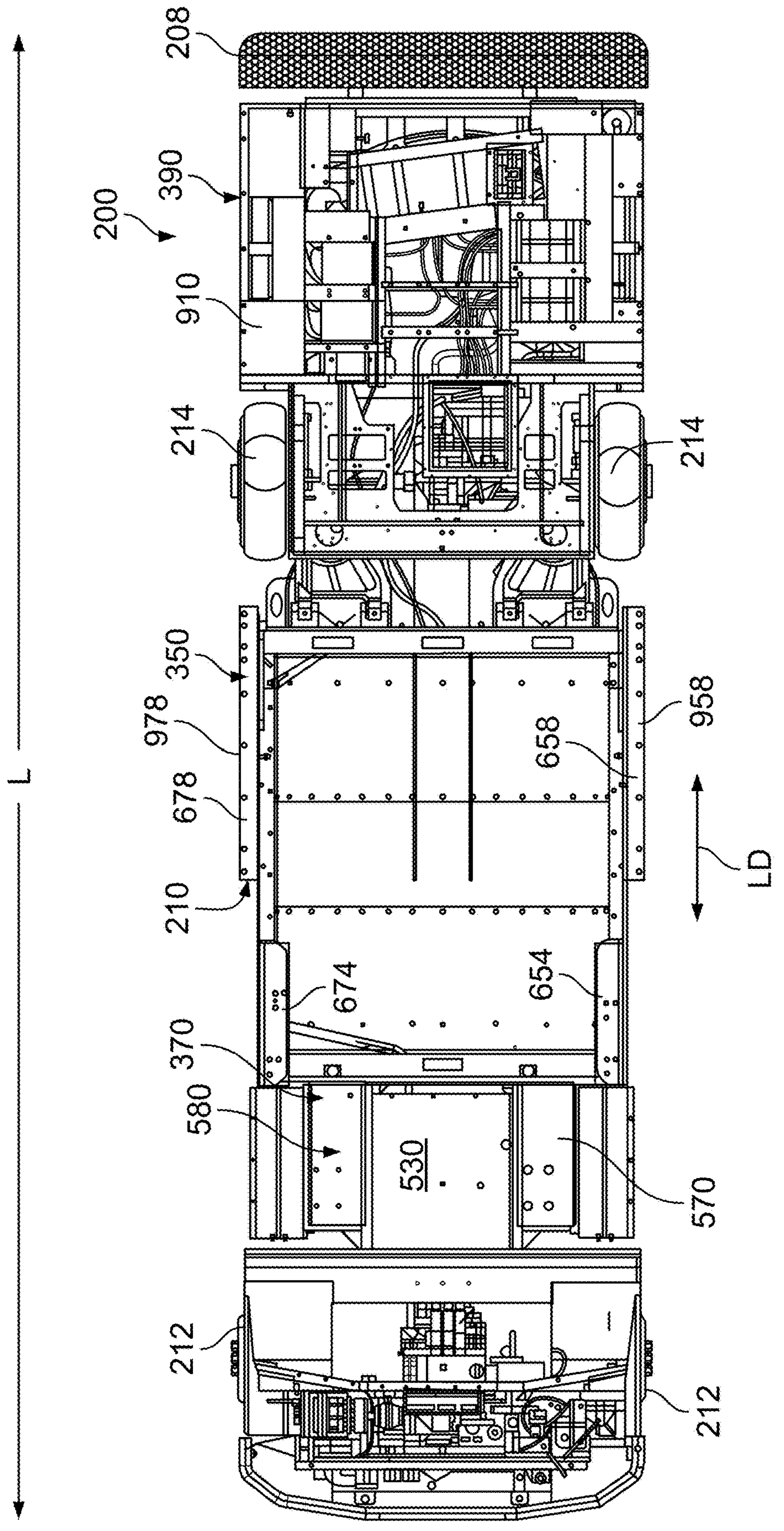
FIG. 9 is a top view of the vehicle chassis of FIG. 2 depicting various sections or segments of the assembled chassis arranged along a longitudinal axis.

The illustrative power source cradle assembly 350 of the chassis 210 is arranged between the front wheels 212 and the rear wheels 214 in the longitudinal direction LD. More specifically, as best seen in FIG. 9, the power source cradle assembly 350 is arranged midway along a length L of the vehicle 200 in the longitudinal direction LD between the front wheels 212 and the rear wheels 214. In the illustrative embodiment, the power source cradle assembly 350 is at least partially defined by, and directly coupled to, the midframe assembly 370, as discussed below.

The power source cradle assembly 350 illustratively includes a crossbeam assembly 610 (see FIG. 6), a crossbeam assembly 630, a sidewall assembly 650, and a sidewall assembly 670. The crossbeam assembly 610 is disposed at a forward end 354 of the power source cradle assembly 350 and extends in the lateral direction LD' between the sidewall assemblies 650, 670. The crossbeam assembly 630 is disposed at a rear end 356 of the power source cradle assembly 350 opposite the forward end 354 and extends in the lateral direction LD' between the sidewall assemblies 650, 670. The sidewall assembly 650 is disposed at a lateral side 358 of the power source cradle assembly 350 and extends in the longitudinal direction LD to couple the crossbeam assembly 610 and the crossbeam assembly 630. The sidewall assembly 670 is disposed at a lateral side 362 of the power source cradle assembly 350 opposite the side 358 and extends in the longitudinal direction LD to couple the crossbeam assembly 610 and the crossbeam assembly 630. In some embodiments, the crossbeam assemblies 610, 630 and the sidewall assemblies 650, 670 cooperatively establish the enclosure 608 for storing the power sources 352.

In some embodiments, the crossbeam assembly 610 may be included in, or otherwise form a portion of, the midframe assembly 370. In such embodiments, the midframe assembly 370 and the power source cradle assembly 350 may cooperatively establish the enclosure 608. Additionally, in some embodiments, the power source cradle assembly 350 at least partially houses a cooling air distribution chamber or plenum 690 (shown in phantom) in the enclosure 608. The plenum 690 may be configured to supply cooling air to the power sources 352 stored in the enclosure 608 to cool the power sources 352 in use thereof. In some embodiments, cooling air may be provided by one or more cooling air sources (e.g., one or more blowers, heat exchangers, or the like) adapted for positioning in the enclosure 608 or another suitable location.

The illustrative electronics cradle assembly 390 of the chassis 210 is arranged rearward of the rear wheels 214 in the longitudinal direction LD. More specifically, as best seen in FIG. 9, the electronics cradle assembly 390 is arranged rearward of the rear wheels 214 and forward of the rear bumper 208 in the longitudinal direction LD. In the illustrative embodiment, the electronics cradle assembly 390 includes a cover plate 910 (see FIG. 9) that extends from a forward end 392 of the electronics cradle assembly 390 to a rear end 394 of the electronics cradle assembly 390 arranged opposite the forward end 392 to at least partially cover the electronic devices supported by the cradle assembly 390 in use thereof.

As shown in FIG. 3A, the illustrative vehicle 200 includes a variety of features in addition to the aforementioned devices, assemblies, and/or systems. Those features include, but are not limited to, the following: a skid plate system 302 arranged beneath at least a portion of the front suspension subframe assembly 310 and/or the midframe assembly 370 in the vertical direction VD that includes skid plates 304 and 306; step supports 312, 314 each affixed to a step platform 316 that is located at least partially beneath the main floor body 222 in the vertical direction VD; an instrument panel assembly 318 arranged in the operator cabin 232 above the main floor body 222 in the vertical direction VD; a firewall assembly 322 arranged between the front bumper 206 and the instrument panel assembly 318 in the longitudinal direction LD; a crossbar assembly 324 coupled to the firewall assembly 322 that extends across the firewall assembly 322 in the lateral direction LD'; one or more wiring harnesses or carriers 326 for routing and/or carrying various electrical cables or wiring that may be arranged at least partially between the front suspension subframe assembly 310 and the midframe assembly 370 in the longitudinal direction LD; and a junction box 328.

Figure 3B:
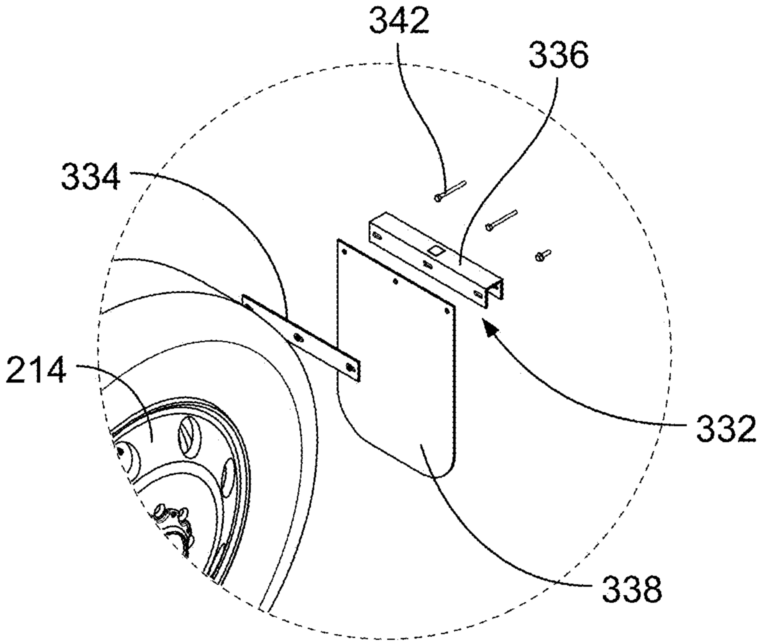
FIG. 3B is a magnified view of one portion of the vehicle chassis of FIG. 3A.

As shown in FIG. 3B, the illustrative vehicle 200 includes a mudflap assembly 332 mounted adjacent to each one of the rear wheels 214. In some embodiments, each mudflap assembly 332 is mounted adjacent to the corresponding rear wheel 214 such that each mudflap assembly 332 is arranged at least partially rearward of the corresponding rear wheel 214 in the longitudinal direction LD. Each mudflap assembly 332 includes a mudflap mount bracket 334, a mudflap support bar 336, a mudflap 338, and one or more fasteners 342. The mudflap mount bracket 334 is mounted to the chassis 210 (e.g., the rear suspension subframe assembly 330). The mudflap support bar 336 is coupled to the mudflap mount bracket 334 using the fasteners 342 when the mudflap 338 is sandwiched between the mudflap mount bracket 334 and the mudflap support bar 336.

Figure 3C:
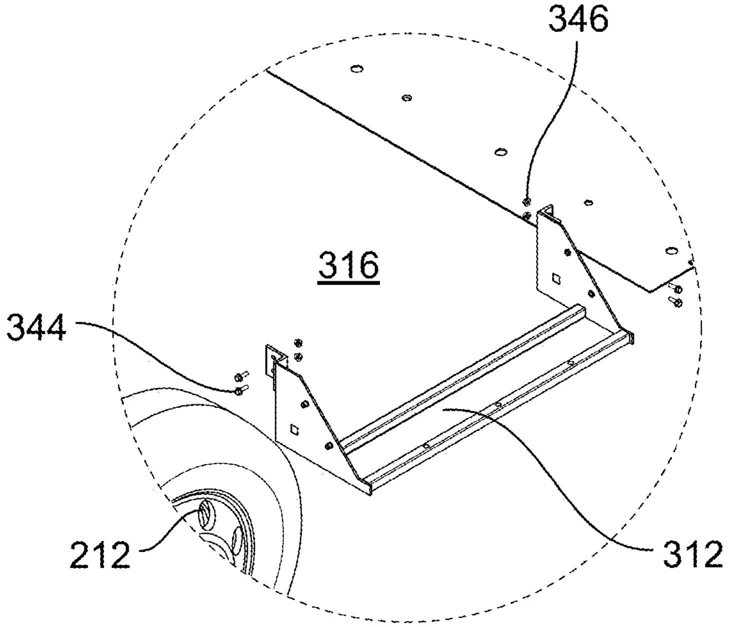
FIG. 3C is a magnified view of another portion of the vehicle chassis of FIG. 3A.

As shown in FIG. 3C, the step supports 312, 314 (note that only step support 312 is depicted) are affixed to the step platforms 316 adjacent to each one of the front wheels 212. In some embodiments, each step support 312, 314 is affixed to the corresponding step platform 316 such that each step support 312, 314 is arranged at least partially rearward of the corresponding front wheel 212 in the longitudinal direction LD. Each step support 312, 314 is affixed to the corresponding step platform 316 using one or more fasteners 344 and one or more locknuts 346.

Figure 4A:
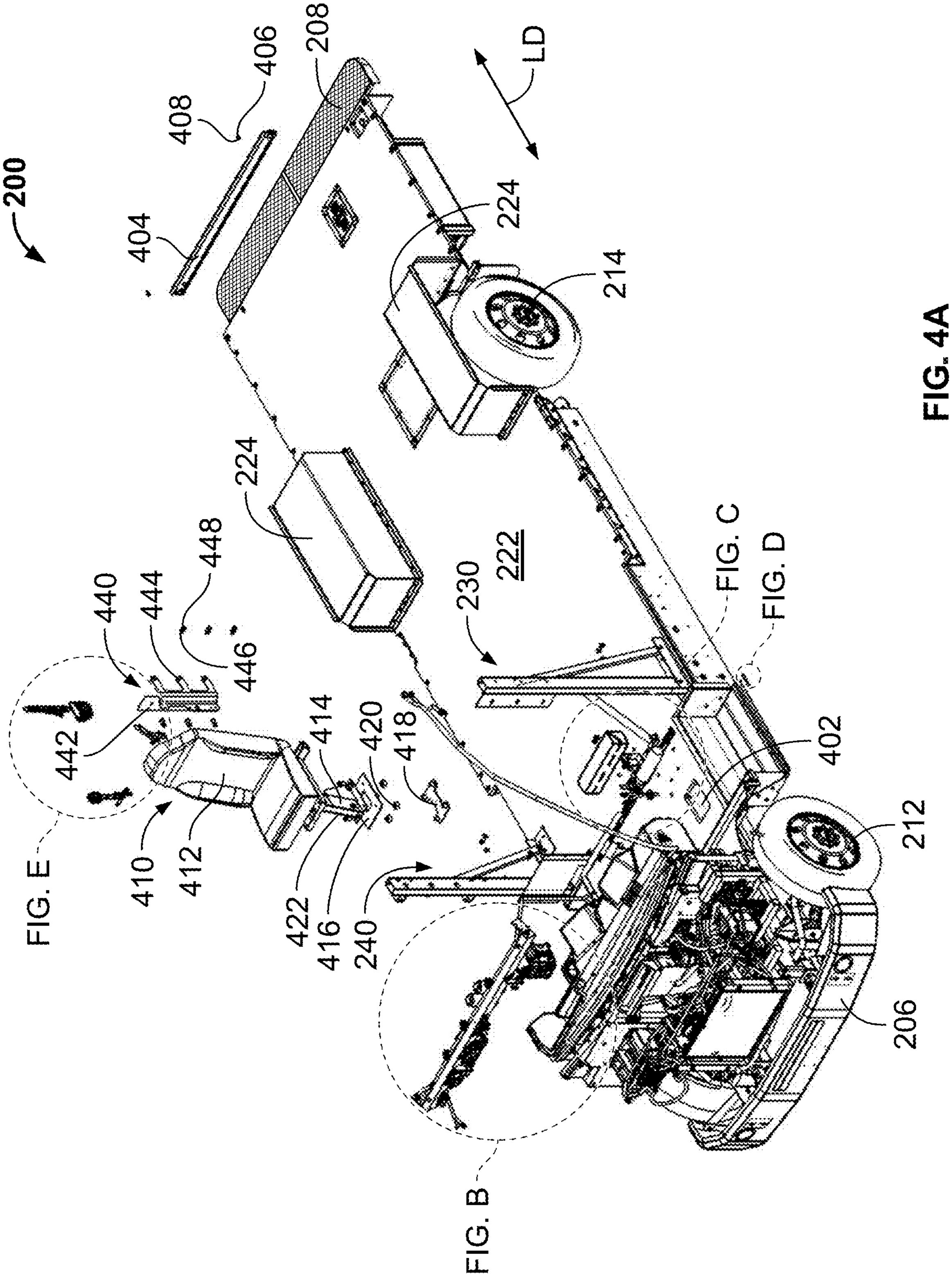
FIG. 4A is a partially exploded perspective view of the vehicle chassis of FIG. 2 showing at least one seat frame assembly de-coupled from the chassis and a pair of seatbelt tower assemblies coupled to the chassis.

Referring now to FIG. 4A, the vehicle 200 is illustrated with the chassis 210 covered by the floor assembly 220 and each of the seatbelt tower assembly 230 and the seat frame assembly 240 mounted to the floor assembly 220. A driver's seat assembly 410 and a driver's seatbelt assembly 440 are illustrated in the partially exploded view of FIG. 4 as being adapted for positioning in the operator cabin 232. The driver's seat assembly 410 includes a driver seat 412, a seat pedestal 414, a seat mount plate 416, a weldment plate 418, spacers 420, and fastener(s) 422. The driver's seatbelt assembly 440 includes a bulkhead mount 442, a seatbelt mount bracket 444, fastener(s) 446, and nut(s) 448.

In the illustrative embodiment, the floor assembly 220 (e.g., the main floor body 222) is formed to include a rectangular cavity 402 disposed in the operator cabin 232. In some embodiments, the cavity 402 may extend in the vertical direction VD through the floor assembly 220 to the chassis 210. The driver's seat 412 is coupled to and supported above the floor assembly 220 by the seat pedestal 414, and the seat pedestal 414 is mounted to the floor assembly 220 and/or the chassis 210 using the seat mount plate 416, the weldment plate 418, the spacers 420, and the fasteners 422. In the illustrative mounting arrangement, the spacers 420 are arranged between the seat mount plate 416 and the weldment plate 418 in the vertical direction VD. In some embodiments, when the seat assembly 410 is mounted in the cabin 232, one or more of the seat mount plate 416, the weldment plate 418, and the spacers 420 are at least partially positioned in the cavity 402. Additionally, in some embodiments, when the seat assembly 410 is mounted in the cabin 232, at least one component thereof (e.g., the weldment plate 418) indirectly or directly contacts the front suspension subframe assembly 310 of the chassis 210.

In the illustrative embodiment, the driver's seatbelt assembly 440 is adapted for securement to a bulkhead (not shown) at least partially positioned in the operator cabin 232. More specifically, the bulkhead mount 442 is configured for direct interaction and/or contact with the bulkhead and the seatbelt mount bracket 444 may be coupled to the bulkhead mount 442 using the fasteners 446 and the nuts 448. In some embodiments, the fasteners 446 may be identical or substantially identical to the fasteners 422. Additionally, in some embodiments, when the seatbelt assembly 440 is secured to the bulkhead, the seatbelt assembly 440 may be at least partially supported by the seatbelt tower assembly 230.

A rear bumper plate 404 is illustratively included in the rear bumper 208 as shown in FIG. 4A. The rear bumper plate 404 may be mounted to the chassis 210 (e.g., the electronics cradle assembly 390) using one or more fasteners 406 and one or more nuts 408. In the illustrative embodiment, a number of sensors configured for interaction with, and/or mounting to, the rear bumper plate 404 are omitted.

Figure 4B:
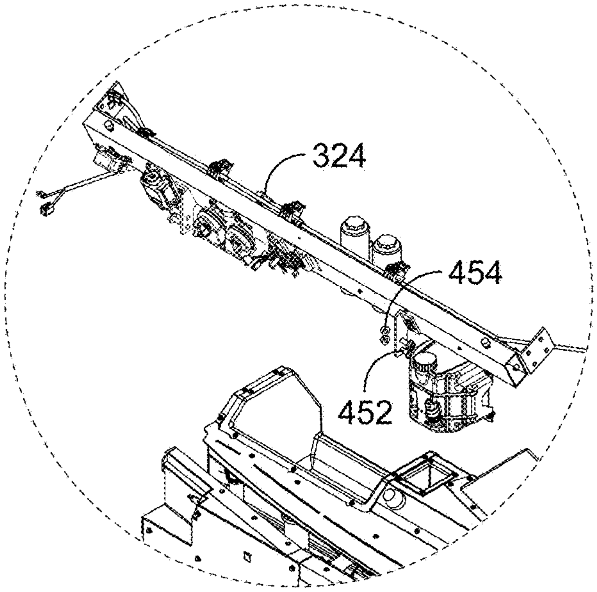
FIG. 4B is a magnified view of one portion of the vehicle chassis of FIG. 4A.

As shown in FIG. 4B, the crossbar assembly 324 is adapted to be coupled to the firewall assembly 322 using one or more fasteners 452 and one or more nuts 454. In some embodiments, when the crossbar assembly 324 is coupled to the firewall assembly 322, the assemblies 322, 324 are arranged beneath a hood (not shown) of a body of the vehicle 200. Additionally, in some embodiments, the assemblies 322, 324 may include, or otherwise provide, structural reinforcement features configured for deformation in response to impact forces applied proximate the front end 202 of the vehicle 200.

Figure 4C:
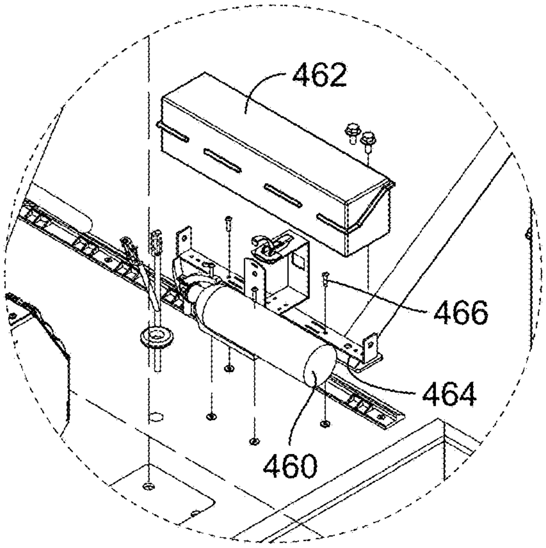
FIG. 4C is a magnified view of another portion of the vehicle chassis of FIG. 4A.

As shown in FIG. 4C, the illustrative vehicle 200 includes a fire extinguisher 460, a triangle kit 462, a mounting bracket 464, and one or more fasteners 466. In some embodiments, the fire extinguisher 460 is removably attached to the floor assembly 220 (e.g., the main floor body 222) such that the fire extinguisher 460 is arranged between the cavity 402 and the seatbelt tower assembly 230 in the longitudinal direction LD. Additionally, in some embodiments, the triangle kit 462 is removably mounted to the floor assembly 220 (e.g., the main floor body 222) using the mounting bracket 464 and the fasteners 466 such that the triangle kit 464 is arranged between the cavity 402 and the seatbelt tower assembly 230 in the longitudinal direction LD. Further, in some embodiments, when the fire extinguisher 460 and the triangle kit 462 are attached to the floor assembly 220, the fire extinguisher 460 and the triangle kit 462 are arranged in the vertical direction VD below the driver's seat assembly 410.

Figure 4D:
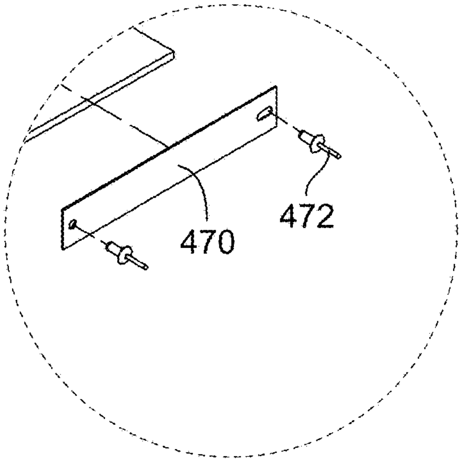
FIG. 4D is a magnified view of yet another portion of the vehicle chassis of FIG. 4A

As shown in FIG. 4D, the illustrative vehicle 200 includes a plate 470 that may be coupled to a suitable structure using one or more rivets 472. In one example, the plate 470 may be coupled to a structure (e.g., the instrument panel assembly 318) arranged in the operator cabin 232. In another example, the plate 470 may be coupled to a structure of the floor assembly 220 (e.g., one of the step platforms 316 or one of the step supports 312, 314) and arranged in close proximity to the operator cabin 232. In yet another example, the plate 470 may be coupled to a structure of the chassis 210 (e.g., the front suspension subframe assembly 310) and arranged in close proximity to the operator cabin 232. Regardless, in some embodiments, the plate 470 may include vehicle identification information (e.g., the vehicle identification number (VIN)) for the vehicle 200.

Figure 4E:
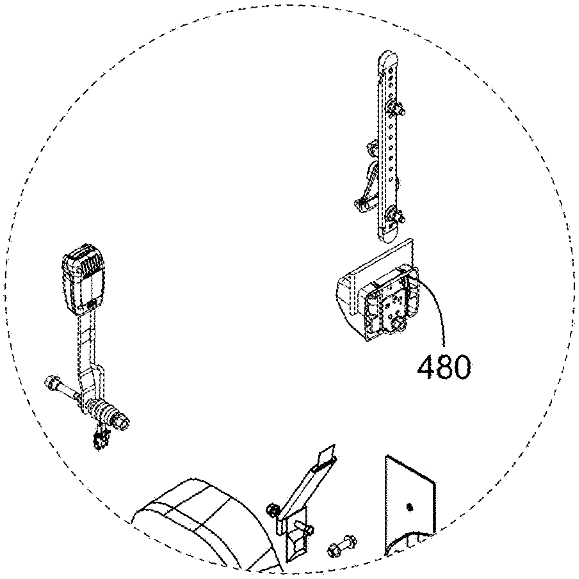
FIG. 4E is a magnified view of another portion still of the vehicle chassis of FIG. 4A.

As shown in FIG. 4E, the illustrative vehicle 200 includes a seatbelt mechanism 480 adapted for inclusion in the driver's seatbelt assembly 440. In one example, the seatbelt mechanism 480 may be directly coupled to the bulkhead mount 442 and/or the seatbelt mount bracket 444. In another example, the seatbelt mechanism 480 may be directly coupled to one or more structures included in the seatbelt tower assembly 230. In any case, in some embodiments, the seatbelt mechanism 480 includes, or is otherwise embodied as, a 3-point seat belt/lap belt mechanism.

Referring now to FIG. 5, the illustrative front suspension subframe assembly 310 includes a powertrain unit cradle 510 and a base block 530 coupled to the powertrain unit cradle 510 and arranged rearward of the powertrain unit cradle 510 in the longitudinal direction LD. The powertrain unit cradle 510 at least partially houses the powertrain unit 360 of the vehicle 200. The powertrain unit cradle 510 and the base block 530 are illustratively mounted to and supported by the base rails 1112, 1114.

The illustrative midframe assembly 370 includes support arm structures 570, 580 that are spaced apart from one another in the lateral direction LD'. As best seen in FIG. 9, when the vehicle 200 is assembled, the front suspension subframe assembly 310 is coupled to the midframe assembly 370 such that the base block 530 is arranged between the support arm structures 570, 580 in the lateral direction LD'. Additionally, when the vehicle 200 is assembled, the front suspension subframe assembly 310 is coupled to the midframe assembly 370 such that the base block 530 is aligned with the support arm structures 570, 580 in the longitudinal direction LD.

In some embodiments, when the front suspension subframe assembly 310 is coupled to the midframe assembly 370, the support arm structure 570 interfaces with, and may be directly coupled to, the base rail 1112. Additionally, in some embodiments, when the front suspension subframe assembly 310 is coupled to the midframe assembly 370, the support arm structure 580 interfaces with, and may be directly coupled to, the base rail 1114. In any case, in the illustrative embodiment, when the front suspension subframe assembly 310 is coupled to the midframe assembly 370, the base block 530 and the rails 1112, 1114 are at least partially received in a gap 572 extending in the lateral direction LD' between the support arm structures 570, 580.

As shown in FIG. 5, the illustrative vehicle 200 includes a variety of features in addition to the aforementioned devices, assemblies, and/or systems. Those features include, but are not limited to, the following: an oval trim piece 540 coupled to the crossbeam assembly 610 such that the trim piece 540 surrounds a central aperture 618 formed in the crossbeam assembly 610; a trim piece 544 at least partially disposed in the cage 1010 of the front suspension subframe assembly 310; a brake line connector 546 at least partially disposed in the cage 1010; one or more grommets 548; one or more fasteners 550; one or more fasteners 552 that may be distinguishable from the fasteners 550; one or more fasteners 554 that may be distinguishable from the fasteners 550, 552; one or more nuts 556; and one or more nuts 558 that may be distinguishable from the nuts 556.

Figure 6:
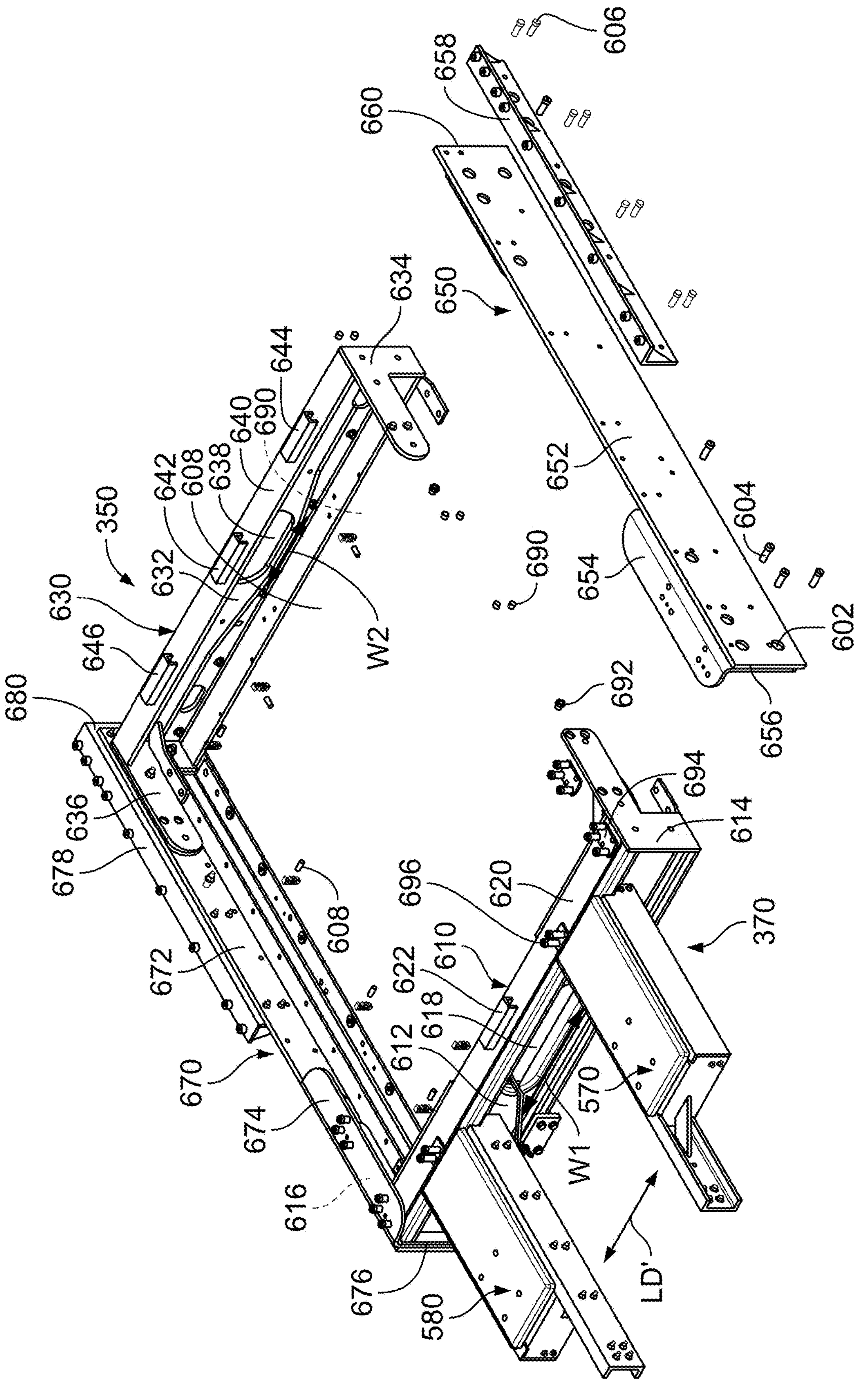
FIG. 6 is a perspective view of part of the chassis of FIG. 3A with certain features omitted for the sake of clarity that illustrates the midframe assembly coupled to various structures to at least partially define a power source cradle assembly.

Referring now to FIG. 6, in the illustrative embodiment, the support arm structures 570, 580 of the midframe assembly 370 are directly affixed to the crossbeam assembly 610 of the power source cradle assembly 350 which extends in the lateral direction LD' to couple the structures 570, 580 to one another. In some embodiments, the crossbeam assembly 610 may be said to at least partially define the midframe assembly 370. The crossbeam assembly 610, the crossbeam assembly 630, and the sidewall assemblies 650, 670 of the power source cradle assembly 350 are illustratively provided as separate structures coupled to one another to establish the enclosure 608. The illustrative enclosure 608 has a rectangular shape. Of course, in other embodiments, the enclosure 608 may take the shape of other suitable geometric forms.

In the illustrative embodiment, the crossbeam assemblies 610, 630 are structurally distinguishable from one another in at least one aspect. In other embodiments, however, the crossbeam assemblies 610, 630 may be identical or substantially identical to one another. Regardless, the illustrative crossbeam assemblies 610, 630 define opposite ends of the power source cradle assembly 350 in the longitudinal direction LD.

As shown in FIGS. 5 and 6, the illustrative crossbeam assembly 610 includes a main body panel 612 arranged to extend in the lateral direction LD' between mount brackets 614, 616 coupled to the main body panel 612 at opposite lateral sides thereof. The mount brackets 614, 616 extend in the longitudinal direction LD toward corresponding structures included in the crossbeam assembly 630. The mount bracket 614 and a corresponding structure of the crossbeam assembly 630 are directly affixed to a sidewall panel 652 of the sidewall assembly 650. The mount bracket 616 and a corresponding structure of the crossbeam assembly 630 are directly affixed to a sidewall panel 672 of the sidewall assembly 670.

The main body panel 612 of the crossbeam assembly 610 is formed to include the central aperture 618 extending therethrough that is located midway between the mount brackets 614, 616 in the lateral direction LD'. The aperture 618 has a width W1 in the lateral direction LD'. In the illustrative embodiment, an upwardly-facing surface 620 of the main body panel 612 in the vertical direction VD is coupled to a standoff bar 622. The standoff bar 622 is aligned with the central aperture 618 in the lateral direction LD'.

As shown in FIG. 6, the illustrative crossbeam assembly 630 includes a main body panel 632 arranged to extend in the lateral direction LD' between mount brackets 634, 636 coupled to the main body panel 632 at opposite lateral sides thereof. The mount brackets 634, 636 extend in the longitudinal direction LD toward corresponding mount brackets 614, 616 of the crossbeam assembly 610. The mount bracket 634 and the mount bracket 614 are directly affixed to the sidewall panel 652 of the sidewall assembly 650. The mount bracket 636 and the mount bracket 616 are directly affixed to the sidewall panel 672 of the sidewall assembly 670.

The main body panel 632 of the crossbeam assembly 630 is formed to include a central aperture 638 extending therethrough that is located midway between the mount brackets 634, 636 in the lateral direction LD'. The aperture 638 has a width W2 in the lateral direction LD' that is less than the width W1 of the aperture 618, at least in some embodiments. In the illustrative embodiment, an upwardly-facing surface 640 of the main body panel 632 in the vertical direction VD is coupled to standoff bars 642, 644, 646. The standoff bar 642 is aligned with the central aperture 638 in the lateral direction LD'. The standoff bars 644, 646 are arranged on opposite sides of the standoff bar 642.

In the illustrative embodiment, the sidewall assemblies 650, 670 are identical or substantially similar to one another. In other embodiments, however, the sidewall assemblies 650, 670 may be distinguishable from one another in at least one aspect. In any case, the illustrative sidewall assemblies 650, 670 define opposite exterior sides of the power source cradle assembly 350 in the lateral direction LD'.

The illustrative sidewall assembly 650 includes a sidewall panel 652 and a flap or tab 654 interconnected with the sidewall panel 652. The sidewall panel 652 has a rectangular shape and is arranged to extend in the vertical direction VD. The flap 654 is interconnected with the sidewall panel 652 such that the flap 654 extends in the lateral direction LD' (which may also be referred to as a horizontal direction) perpendicular or substantially perpendicular to the vertical direction VD. In the illustrative embodiment, the sidewall panel 652 is integral with or integrally formed with the flap 654. In other embodiments, the sidewall panel 652 and the flap 654 may be provided as separate structures that are coupled to one another.

The illustrative flap 654 is disposed at a forward end 656 of the sidewall assembly 650. The sidewall assembly 650 also includes a floor support bar 658 that is coupled to the sidewall panel 652 and positioned for direct contact with an overlying structure (e.g., the main floor body 222). In some embodiments, when coupled to the sidewall panel 652, the floor support bar 658 extends above the sidewall panel 652 in the vertical direction VD. In any case, the floor support bar 658 is disposed at a rear end 660 of the sidewall assembly 650 arranged opposite the forward end 656.

The illustrative sidewall assembly 670 includes a sidewall panel 672 and a flap or tab 674 interconnected with the sidewall panel 672. The sidewall panel 672 has a rectangular shape and is arranged to extend in the vertical direction VD. The flap 674 is interconnected with the sidewall panel 672 such that the flap 674 extends in the lateral direction LD' perpendicular or substantially perpendicular to the vertical direction VD. In the illustrative embodiment, the sidewall panel 672 is integral with or integrally formed with the flap 674. In other embodiments, the sidewall panel 672 and the flap 674 may be provided as separate structures that are coupled to one another.

The illustrative flap 674 is disposed at a forward end 676 of the sidewall assembly 670. The sidewall assembly 670 also includes a floor support bar 678 that is coupled to the sidewall panel 672 and positioned for direct contact with an overlying structure (e.g., the main floor body 222). In some embodiments, when coupled to the sidewall panel 672, the floor support bar 678 extends above the sidewall panel 672 in the vertical direction VD. In any case, the floor support bar 678 is disposed at a rear end 680 of the sidewall assembly 670 arranged opposite the forward end 676.

As shown in FIG. 6, the illustrative vehicle 200 includes a variety of features in addition to the aforementioned devices, assemblies, and/or systems. Those features include, but are not limited to, the following: one or more washers 602; one or more fasteners 604; one or more fasteners 606 that may be distinguishable from the fasteners 604; one or more fasteners 608 that may be distinguishable from the fasteners 604, 606; one or more nuts 690; one or more nuts 692 that may be distinguishable from the nuts 690; one or more weldments 694; and one or more weldments 696 that may be distinguishable from the weldments 694.

Figure 7:
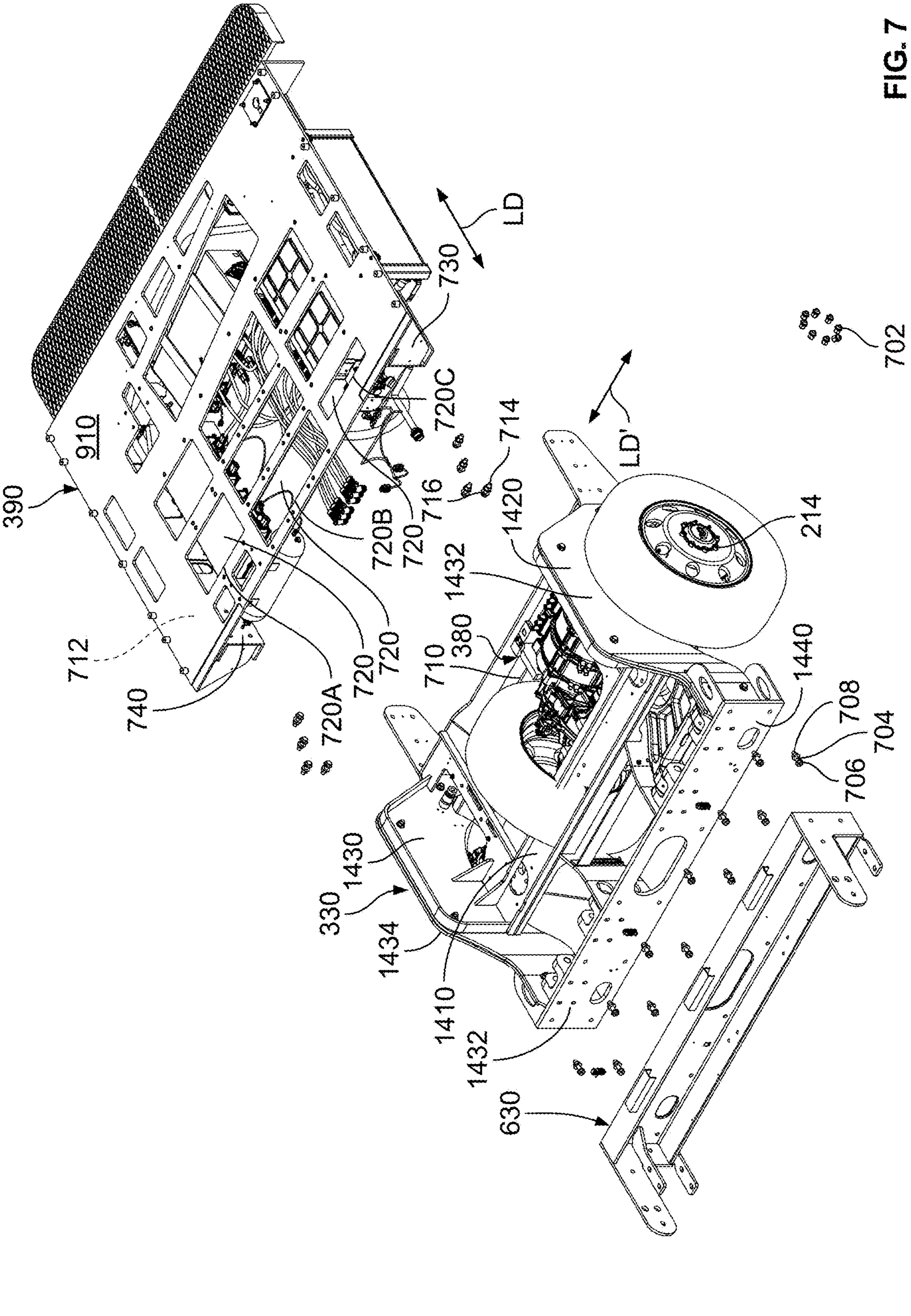
FIG. 7 is a perspective view of part of the chassis of FIG. 3A with certain features omitted for the sake of clarity that illustrates a rear crossbeam assembly of the power source cradle assembly, a pair of rear suspension assemblies mounted to a rear suspension subframe assembly of the chassis, and an electronics cradle assembly supporting a plurality of electronic devices of the vehicle.

Referring now to FIG. 7, the crossbeam assembly 630 of the power source cradle assembly 350 is arranged adjacent to, and forward of, the rear suspension subframe assembly 330 in the longitudinal direction LD. As discussed above, the rear suspension subframe assembly 330 supports the pair of rear suspension assemblies 340A, 340B and the powertrain unit 380, and the suspension assemblies 340A, 340B and the powertrain unit 380 are likewise arranged rearward of the crossbeam assembly 630 in the longitudinal direction LD. The electronics cradle assembly 390 is arranged rearward of the rear suspension assemblies 340A, 340B and the powertrain unit 380 in the longitudinal direction LD.

As mentioned above, the rear suspension subframe assembly 330 includes the base plate 1410, the frame arch 1420, and the frame arch 1430. The rear suspension subframe assembly 330 also includes a faceplate 1440 (see FIG. 14) that is coupled to the frame arches 1420, 1430 at respective forward ends 1422, 1432 thereof. An exterior side 1342 of the faceplate 1440 is arranged in confronting relation to the crossbeam assembly 630 and spaced from (e.g., arranged forward of) the base plate 1410 in the longitudinal direction LD. The base plate 1410 includes a central cavity 710 in which the powertrain unit 380 is at least partially positioned.

The cover plate 910 of the illustrative electronics cradle assembly 390 extends rearward of the base plate 1410 and at least a portion of each of the frame arch 1420 and the frame arch 1430 in the longitudinal direction LD. In the illustrative embodiment, the cover plate 910 is formed to include slots 720. The slots 720 include at least three slot rows 720A, 720B, 720C that are spaced from one another in the lateral direction LD'. In at least some embodiments, provision of the slots 720 in the cover plate 910 may facilitate dissipation of heat produced by electronic devices supported by the cradle assembly 390 in use thereof.

The illustrative electronics cradle assembly 390 includes two channel feet 730, 740 coupled to an underside 712 (shown in phantom) of the cover plate 910. The channel feel 730, 740 are spaced from one another in the lateral direction LD' when coupled to the cover plate 910. In the illustrative embodiment, each of the channel feet 730, 740 has a C-shaped cross-section.

As shown in FIG. 7, the illustrative vehicle 200 includes a variety of features in addition to the aforementioned devices, assemblies, and/or systems. Those features include, but are not limited to, the following: one or more wheel lug nuts 702; one or more washers 704; one or more fasteners 706; one or more nuts 708; one or more fasteners 714 that may be distinguishable from the one or more fasteners 706; and one or more nuts 716 that may be distinguishable from the one or more nuts 708.

Figure 8A:
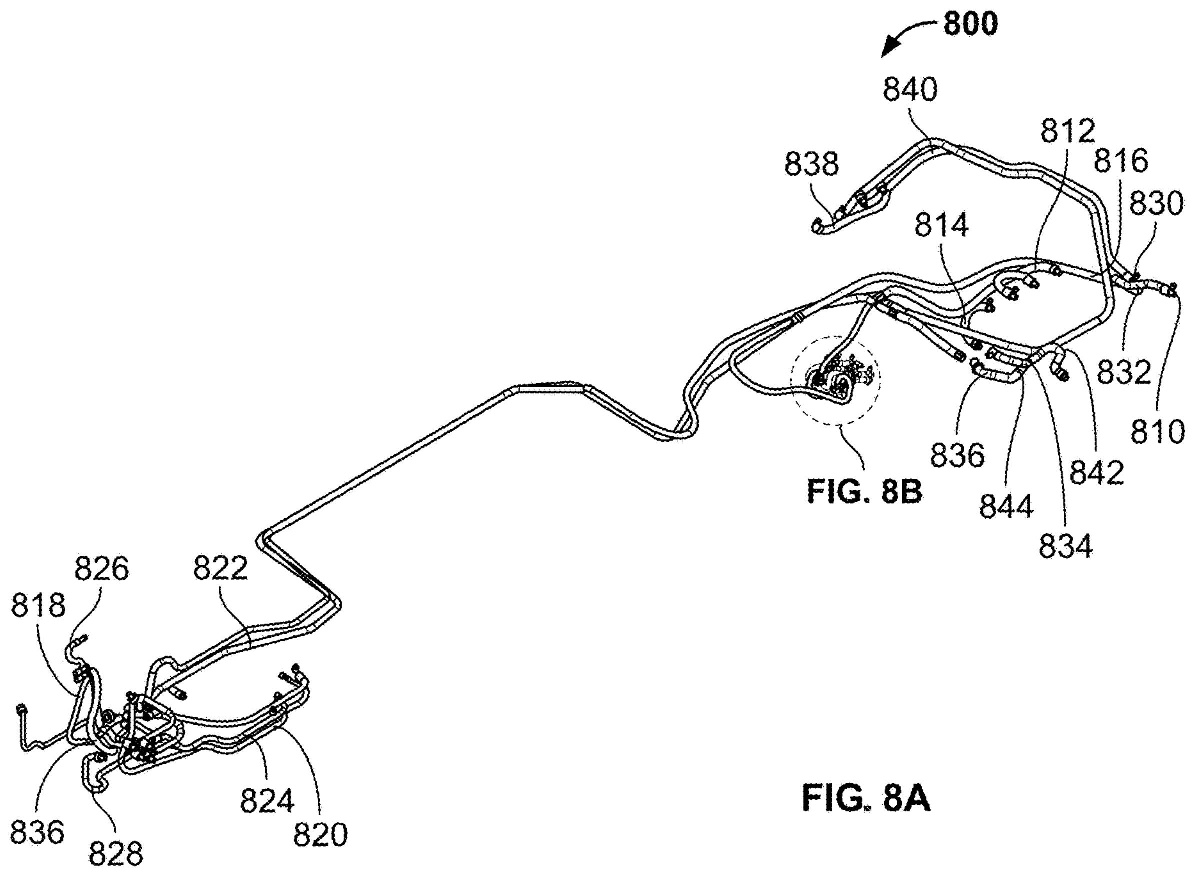
FIG. 8A is a perspective view of part of the chassis of FIG. 3A with certain features omitted for the sake of clarity that illustrates a collection of hoses or cables for supplying electrical power to various devices.

Referring now to FIG. 8A, the illustrative vehicle 200 includes a network 800 of components that may be used to deliver electrical power to various electronic devices of the vehicle 200. As discussed below, some components of the network 800 include, or are otherwise embodied as, electrical hoses, hose kits, cables, or segments thereof capable of delivering electrical power (e.g., power produced by the power sources 352) to various electronic devices of the vehicle 200. In some embodiments, the electrical hoses and/or cables included in the network 800 may be routed from the electronics cradle assembly 390 to electronic devices arranged in other sections of the multi-segment chassis 210, such as one or more electronic devices arranged in the front suspension subframe assembly 310, the rear suspension subframe assembly 330, the power source cradle assembly 350, and/or the midframe assembly 370, for example.

The illustrative network 800 includes a hose clamp 810, a hose or hose kit 812, a hose 814, a hose or hose kit 816, a hose or hose kit 818, a hose 820, a hose or hose kit 822, a hose or hose kit 824, a hose or hose kit 826, a hose 828, a fitting 830, a hose 832, a fitting 834, a hose 836, a hose 838, a hose 840, a hose 842, and a hose 844. It should be appreciated that each of the hoses or hose kits 812, 814, 816, 818, 820, 822, 824, 826, 828, 832, 836, 838, 840, 842, 844 may be routed in the longitudinal direction LD between the electronics cradle assembly 390 and one of more sections of the chassis 210 arranged forward of the cradle assembly 390. It should also be appreciated that when routed between the electronics cradle assembly 390 and one of more sections of the chassis 210 arranged forward thereof, each of the hoses or hose kits 812, 814, 816, 818, 820, 822, 824, 826, 828, 832, 836, 838, 840, 842, 844 may be retained and/or secured with one or more clamps (e.g., the hose clamp 810), ties, or the like. Further, it should be appreciated that the hoses or hose kits 812, 814, 816, 818, 820, 822, 824, 826, 828, 832, 836, 838, 840, 842, 844 may be coupled to one another with one or more fittings (e.g., the fittings 830, 834) and/or quick disconnect couplings.

Figure 8B:
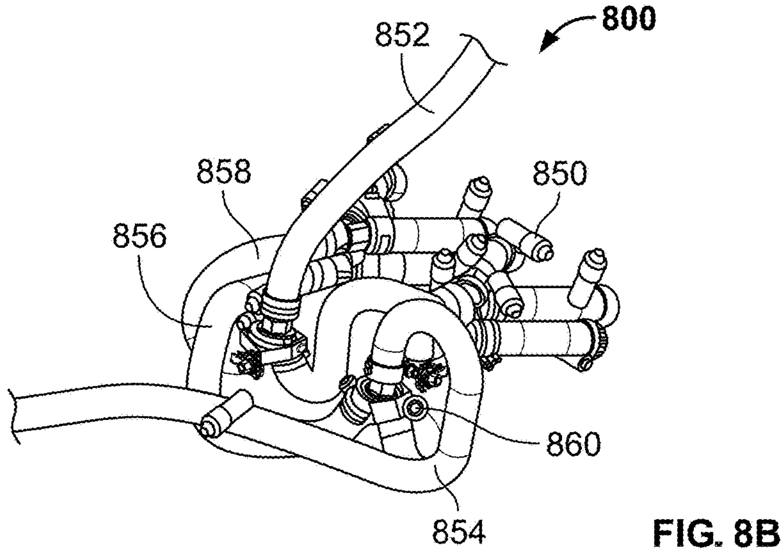
FIG. 8B is a magnified view of one portion of the collection of hoses of FIG. 8A.

Referring now to FIG. 8B, the illustrative network 800 includes a hose clamp 850, a hose 852, a hose 854, a hose 856, a hose 858, and a fitting 860. It should be appreciated that each of the hoses 852, 854, 856, 858 may be routed in the longitudinal direction LD between the electronics cradle assembly 390 and one of more sections of the chassis 210 arranged forward of the cradle assembly 390. It should also be appreciated that when routed between the electronics cradle assembly 390 and one of more sections of the chassis 210 arranged forward thereof, each of the hoses 852, 854, 856, 858 may be retained and/or secured with one or more clamps (e.g., the hose clamp 850), ties, or the like. Further, it should be appreciated that the hoses 852, 854, 856, 858 may be coupled to one another with one or more fittings (e.g., the fitting 860) and/or quick disconnect couplings.

Referring now to FIG. 9, the vehicle 200 is illustratively depicted with the multi-segment chassis 210 at least partially unobscured by the floor assembly 220. In the illustrative embodiment, the support arm structures 570, 580 of the midframe assembly 370, the flap 654 and the floor support bar 658 of the sidewall assembly 650 of the power source cradle assembly 350, and the flap 674 and the floor support bar 678 of the sidewall assembly 670 of the power source cradle assembly 350 are arranged in the longitudinal direction LD between the front wheels 212 and the rear wheels 214. The support arm structures 570, 580 are arranged inwardly in the lateral direction LD' relative to the flaps 654, 674. The flaps 654, 674 are arranged at least partially inwardly in the lateral direction LD' relative to the corresponding floor support bars 658, 678. The floor support bar 658 is disposed midway or substantially midway along the length L of the vehicle 200 in the longitudinal direction LD at an outermost lateral side 958 of the chassis 210. The floor support bar 678 is disposed midway or substantially midway along the length L of the vehicle 200 in the longitudinal direction LD at an outermost lateral side 978 of the chassis 210 that is opposite the side 958.

Referring now to FIGS. 10 and 11, the illustrative front suspension subframe assembly 310 includes the base rails 1112, 1114 spaced from one another in the lateral direction LD' and at least one cross rail 1012 extending in the lateral direction LD' to couple the base rails 1112, 1114 to one another. In some embodiments, the subframe assembly 310 includes at least one crossbeam 1014 arranged rearward of the cross rail 1012 in the longitudinal direction LD that extends in the lateral direction LD' to couple the base rails 1112, 1114 to one another. Additionally, in some embodiments, the crossbeam 1014 is coupled to, or otherwise forms a portion of, the base block 530. In some embodiments still, the base rails 1112, 1114, the cross rail(s) 1012, and the crossbeam(s) 1014 cooperate to at least partially define the cage 1010.

In the illustrative embodiment, bumper mount extensions 1120, 1140 of the front suspension subframe assembly 310 are coupled the base rails 1112, 1114, respectively. In some embodiments, the bumper mount extensions 1120, 1140 extend forward of the respective base rails 1112, 1114 in the longitudinal direction LD and are aligned with, or substantially aligned with, the respective base rails 1112, 1114 in the lateral direction LD'. Additionally, in some embodiments, the bumper mount extensions 1120, 1140 are identical to one another or substantially identical to one another.

As best seen in FIG. 11, the mount extension 1120 includes a planar face 1122 and a planar face 1124 interconnected with the planar face 1122. The planar face 1122 is arranged in confronting relation to the front bumper 206. The planar face 1124 is arranged perpendicular to the planar face 1122. A mounting bracket 1106 of the front bumper 206 includes a mounting surface 1108 arranged to interface directly with the planar face 1122 of the mount extension 1120 and a mounting surface 1110 arranged to interface directly with the planar face 1124 of the mount extension 1120 when the mounting bracket 1106 is affixed to the mount extension 1120 and the front bumper 206 is secured to the front suspension subframe assembly 330.

As best seen in FIG. 11, the mount extension 1140 includes a planar face 1142 and a planar face 1144 interconnected with the planar face 1142. The planar face 1142 is arranged in confronting relation to the front bumper 206. The planar face 1144 is arranged perpendicular to the planar face 1142. A mounting bracket 1126 of the front bumper 206 includes a mounting surface 1128 arranged to interface directly with the planar face 1142 of the mount extension 1140 and a mounting surface 1130 arranged to interface directly with the planar face 1144 of the mount extension 1140 when the mounting bracket 1126 is affixed to the mount extension 1140 and the front bumper 206 is secured to the front suspension subframe assembly 330.

In the illustrative embodiment, a mount plate 1150 is directly coupled to the base rail 1112 such that the mount plate 1150 is aligned with the powertrain unit cradle 510 in the longitudinal direction LD. As further discussed below with reference to FIG. 12, the front suspension assembly 320A is configured for mounting to the mount plate 1150 such that the front suspension assembly 320A is arranged outward of the base rail 1112 in the lateral direction LD'. The mount plate 1150 includes a planar exterior face 1152 arranged for direct contact with the front suspension assembly 320A.

In the illustrative embodiment, a mount plate 1160 is directly coupled to the base rail 1114 such that the mount plate 1160 is aligned with the powertrain unit cradle 510 in the longitudinal direction LD. The front suspension assembly 320B is configured to be mounted to the mount plate 1160 such that the front suspension assembly 320B is arranged outward of the base rail 1114 in the lateral direction LD'. The mount plate 1160 includes a planar exterior face 1162 (shown in phantom) arranged for direct contact with the front suspension assembly 320B.

The illustrative cage 1010 includes an upper beam 1170 disposed at the side 1006 of the cage 1010. The upper beam 1170 is aligned with the base rail 1112 in the lateral direction LD' and arranged above the base rail 1112 in the vertical direction VD. In the illustrative embodiment, the upper beam 1170 is spaced from the base rail 1112 in the vertical direction VD to define an opening 1172 between the upper beam 1170 and the base rail 1112. When the powertrain unit 360 is supported by the front suspension subframe assembly 310 such that powertrain unit 360 extends in the lateral direction LD' through the opposite sides 1006, 1008 of the cage 1010, at least a portion of the powertrain unit 360 extends through the opening 1172. In the illustrative embodiment, the mount plate 1150 is directly coupled to the upper beam 1170 such that the mount plate 1150 is affixed to each of the base rail 1112 and the upper beam 1170 at the side 1006 of the cage 1010.

The illustrative cage 1010 includes an upper beam 1180 disposed at the side 1008 of the cage 1010. The upper beam 1180 is aligned with the base rail 1114 in the lateral direction LD' and arranged above the base rail 1114 in the vertical direction VD. In the illustrative embodiment, the upper beam 1180 is spaced from the base rail 1114 in the vertical direction VD to define an opening 1182 between the upper beam 1180 and the base rail 1114. When the powertrain unit 360 is supported by the front suspension subframe assembly 310 such that powertrain unit 360 extends in the lateral direction LD' through the opposite sides 1006, 1008 of the cage 1010, at least a portion of the powertrain unit 360 extends through the opening 1182. In the illustrative embodiment, the mount plate 1160 is directly coupled to the upper beam 1180 such that the mount plate 1160 is affixed to each of the base rail 1114 and the upper beam 1180 at the side 1008 of the cage 1010.

The illustrative cage 1010 includes a crossbeam 1190 that extends in the lateral direction LD' between the upper beams 1170, 1180 to couple the beams 1170, 1180 to one another. In the illustrative embodiment, the crossbeam 1190 is at least partially received in cutouts 1192, 1194 formed in the upper beams 1170, 1180, respectively. The crossbeam 1190 is arranged at least partially rearward of the mount extensions 1120, 1140 in the longitudinal direction LD. In some embodiments, the crossbeam 1014, the upper beams 1170, 1180, and the crossbeam 1190 cooperate to at least partially enclose an interior space 1196 in which the powertrain unit 360 is positioned.

As best seen in FIG. 11, a steering mechanism 1198 extends across the cage 1010 in the lateral direction LD' and outwardly beyond the sides 1006, 1008 thereof. In the illustrative embodiment, the steering mechanism 1198 includes, or is otherwise embodied as, a steering rack and sway bar assembly. It should be appreciated that in at least some embodiments, the steering mechanism 1198 is coupled to each of the wheels 212 and the corresponding front suspension assemblies 320A, 320B to drive movement (e.g., pivotal movement about an axis extending in the vertical direction VD) of the wheels 212 and the corresponding suspension assemblies 320A, 320B and thereby steer the vehicle 200 in use thereof.

The steering mechanism 1198 is arranged at least partially below the crossbeam 1190 in the vertical direction VD and above the base rail 1112 in the vertical direction VD. In the illustrative embodiment, at least a portion of the steering mechanism 1198 is aligned with, or substantially aligned with, the crossbeam 1190 in the longitudinal direction LD. Additionally, in the illustrative embodiment, the steering mechanism 1198 is arranged at least partially rearward of the mount extensions 1120, 1140 in the longitudinal direction LD.

As shown in FIG. 11, the illustrative vehicle 200 includes a variety of features in addition to the aforementioned devices, assemblies, and/or systems. Those features include, but are not limited to, the following: one or more fasteners 1154; one or more nuts 1156; one or more brake line clips 1158; one or more fasteners 1164 that may be distinguishable from the one or more fasteners 1154; a brake line 1166 for routing to a first braking device (e.g., a braking device adapted to resist rotation of one of the wheels 214); a brake line 1168 for routing to a second braking device (e.g., a braking device adapted to resist rotation of the other of the wheels 214); grommets or grommet mounts 1174 sized to be received in one or more bores 1176 formed in the front bumper 206; and indicators (e.g., turn signals, lights, reflectors, or the like) 1178 adapted to be mounted in the bores 1176 using the grommets 1174.

Figure 12:
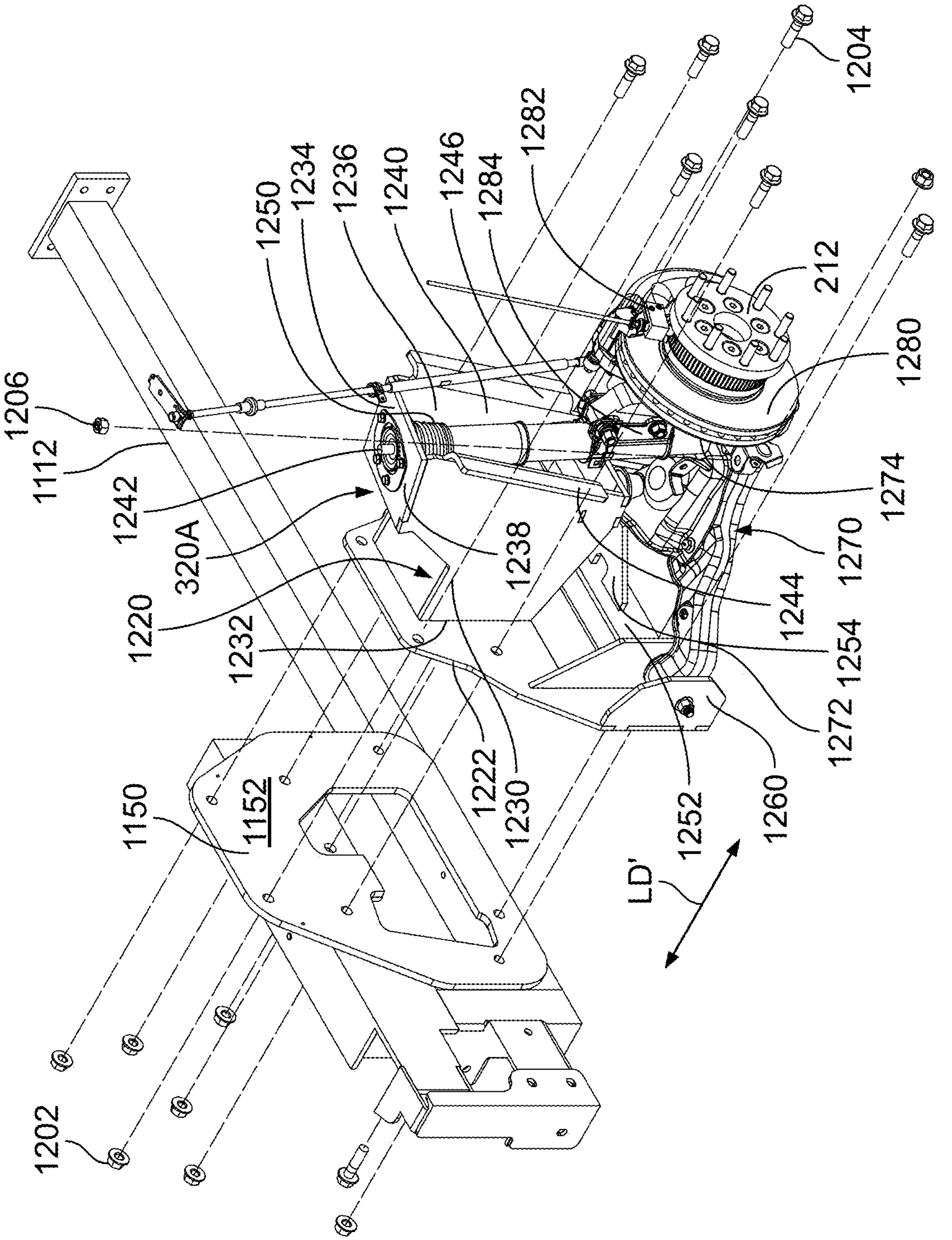
FIG. 12 is a partially exploded perspective view of the part of the chassis shown in FIG. 10 depicting one of the pair of front suspension assemblies arranged for mounting to a base rail of the front suspension subframe assembly.

Referring now to FIG. 12, the illustrative front suspension assembly 320A includes a mount structure 1220 having a planar mount face 1222 arranged in direct contact with the planar exterior face 1152 of the mount plate 1150. The mount structure 1220 includes a case extension 1230 coupled to the planar mount face 1222 that extends outwardly away from the planar mount face 1222 in the lateral direction LD'. In the illustrative embodiment, the case extension 1230 at least partially covers and/or overhangs a number of components of the front suspension assembly 320A.

The case extension 1230 includes an end 1232 that is interconnected with, and closed off by, the planar mount face 1222. The case extension 1230 also includes an end 1234 that is arranged opposite the end 1232 in the lateral direction LD'. The end 1234 at least partially defines and/or opens into a cavity 1236 that receives a shock absorber 1240 of the front suspension assembly 320A. The shock absorber 1240 is movably coupled to the mount structure 1220 and a swing arm assembly 1270. In the illustrative embodiment, a spring 1250 surrounds the shock absorber 1240 such that the spring 1250 is positioned in the cavity 1236 adjacent an upper surface 1238 of the case extension 1230. In some embodiments, the shock absorber 1240 extends at least partway through a bore 1242 formed in the upper surface 1238. In the illustrative embodiment, the case extension 1230 includes arcuate tabs 1244, 1246 at least partially defining the end 1234.

The mount structure 1220 includes a mounting bracket 1260 to which the control arm assembly or swing arm assembly 1270 of the front suspension assembly 320A is movably coupled. The swing arm assembly 1270 includes a disc 1280 on which one of the front wheels 212 may be rotatably mounted in use of the vehicle 200. A braking device 1282 may be engaged or activated to selectively resist rotation of the disc 1280 and the wheel 212, at least in some embodiments. Additionally, in some embodiments, the swing arm assembly 1270 and the disc 1280 may be integrally formed as a single structure.

The illustrative swing arm assembly 1270 includes a swing arm 1272 movably coupled to the mounting bracket 1260 and a knuckle 1274 coupled to the swing arm 1272 and the disc 1280. In some embodiments, the knuckle 1274 may include, or otherwise be embodied as, a mechanical coupling (e.g., a pivotal coupling), joint, linkage, or the like adapted for connection to the steering mechanism 1198 to permit movement and/or steering of the wheel 212 driven by the steering mechanism 1198 in use of the vehicle 200. In some embodiments, the shock absorber 1240 is coupled to the knuckle 1274 via a joint 1284 to permit movement of the shock absorber 1240 relative to the knuckle 1274 in use of the vehicle 200.

The mount structure 1220 also includes a lower projection 1252 that is arranged at least partially beneath the case extension 1230 in the vertical direction VD. In the illustrative embodiment, the lower projection 1252 extends outwardly away from the planar mount face 1222 in the lateral direction LD' beneath the case extension 1230. In some embodiments, the lower projection 1252 includes a rib 1254 coupled to the case extension 1230. Additionally, in some embodiments, the rib 1254 cooperates with the case extension 1230 to at least partially define and/or enclose the cavity 1236.

As shown in FIG. 12, the illustrative vehicle 200 includes a variety of features in addition to the aforementioned devices, assemblies, and/or systems. Those features include, but are not limited to, the following: one or more nuts 1202; one or more fasteners 1204 utilized in conjunction with the nuts 1202 to secure the mount structure 1220 to the mount plate 1150; and one or more nuts 1206 that may be distinguishable from the nuts 1202.

Referring now to FIGS. 13 and 14, the rear suspension subframe assembly 330 is illustrated as supporting the rear suspension assemblies 340A, 340B and the powertrain unit 380 in FIG. 13 and with the rear suspension assemblies 340A, 340B and the powertrain unit 380 omitted in FIG. 14. In the illustrative embodiment, a swing arm assembly 1310 of the rear suspension assembly 340A is pivotally coupled to the rear suspension subframe assembly 330 via hinge joints 1302, 1304. Additionally, in the illustrative embodiment, a swing arm assembly 1312 of the rear suspension assembly 340B is pivotally coupled to the rear suspension subframe assembly 330 via hinge joints 1306, 1308.

Figure 15:
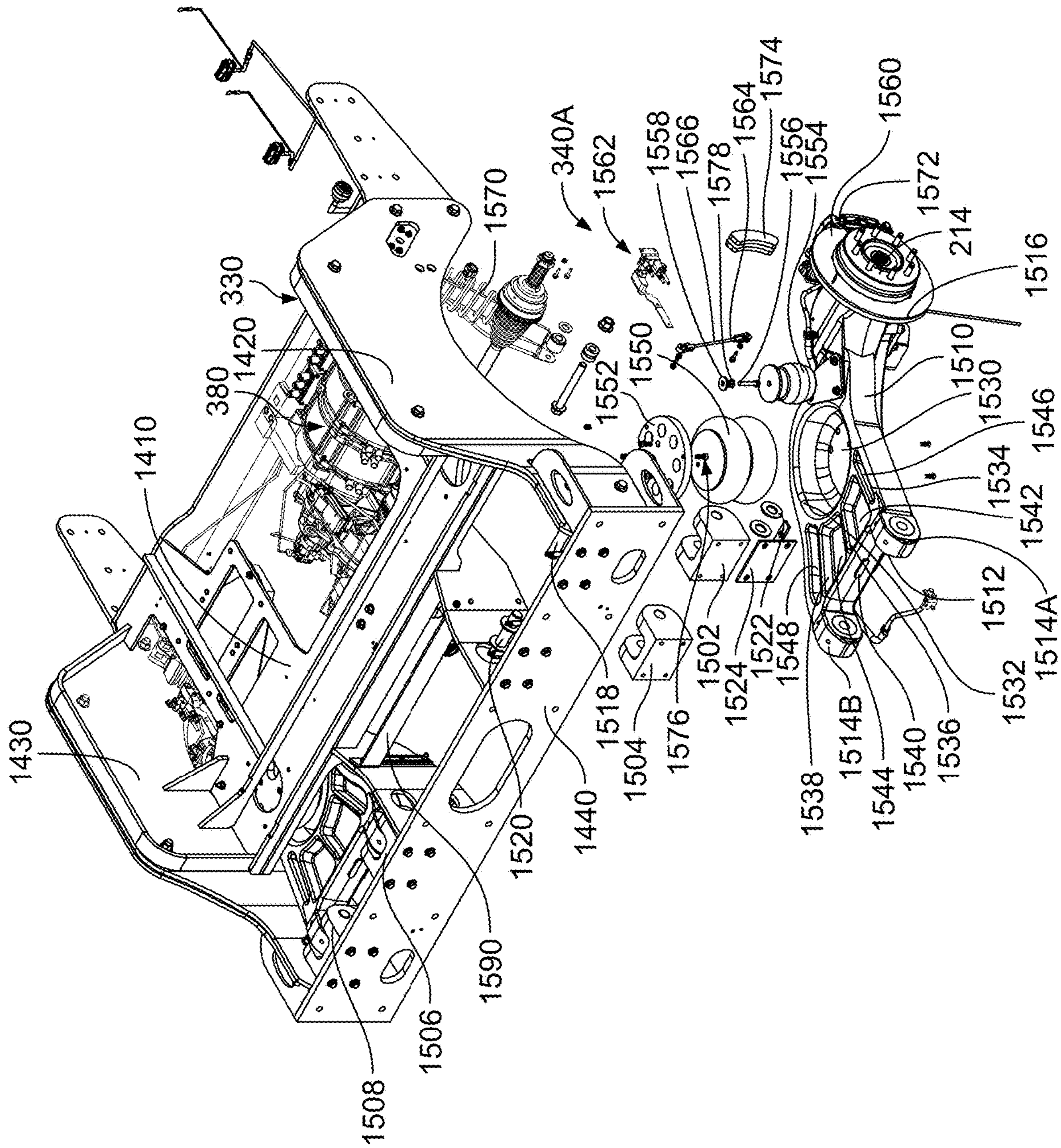
FIG. 15 is a partially exploded perspective view of one of the pair of rear suspension assemblies shown in FIG. 13.

As best seen in FIGS. 13 and 15, the hinge joints 1302, 1304 includes respective hinge elements 1502, 1504 that are affixed directly to the faceplate 1440 of the rear suspension subframe assembly 330. In some embodiments, the hinge elements 1502, 1504 are arranged in direct contact with an interior side 1344 (shown in phantom) of the faceplate 1440 arranged opposite the exterior side 1342. The hinge joints 1302, 1304 are arranged in the lateral direction LD' between the frame arch 1420 and a weldment brace 1320 of the rear suspension subframe assembly 330 that is coupled to the base plate 1410 and the faceplate 1440. The hinge joint 1302 is illustratively arranged closer to the frame arch 1420 in the lateral direction LD' than the hinge joint 1304.

The hinge joints 1306, 1308 illustratively includes respective hinge elements 1506, 1508 that are affixed directly to the faceplate 1440 of the rear suspension subframe assembly 330. In some embodiments, the hinge elements 1506, 1508 are arranged in direct contact with the interior side 1344 of the faceplate 1440. The hinge joints 1306, 1308 are arranged in the lateral direction LD' between the frame arch 1430 and a weldment brace 1330 of the rear suspension subframe assembly 330 that is coupled to the base plate 1410 and the faceplate 1440 and spaced from the weldment brace 1320 in the lateral direction LD'. The hinge joint 1308 is illustratively arranged closer to the frame arch 1430 in the lateral direction LD' than the hinge joint 1306.

Referring now to FIG. 14, the base plate 1410 illustratively has a U-shaped cross-section and includes a body 1402, an extension arm 1404 interconnected with the body 1402 that extends rearward away from the body 1402 in the longitudinal direction LD, and an extension arm 1406 interconnected with the body 1402 that extends rearward away from the body 1402 in the longitudinal direction LD. In some embodiments, the body 1402, the extension arm 1404, and the extension arm 1406 are integrally formed such that the base plate 1410 has a one-piece construction. In any case, the body 1402, the extension arm 1404, and the extension arm 1406 cooperate to define the central cavity 710. The body 1402 is formed to include an aperture 1402A arranged proximate a lateral end 1403 of the body 1402 and an aperture 1402B arranged proximate a lateral end 1405 of the body 1402 that is opposite the end 1403. The extension arm 1404 is formed to include a pair of rectangular slots 1404A, 1404B and the extension arm 1406 is formed to include a pair of rectangular slots 1406A, 1406B (shown in phantom).

In the illustrative embodiment, a U-shaped bar 1408 is coupled to the base plate 1410 and the frame arch 1420 and arranged in abutment with an interior face 1426 (shown in phantom) of the frame arch 1420. The bar 1408 is arranged to extend along the lateral end 1403 of the body 1402 rearward in the longitudinal direction LD to the extension arm 1406. The bar 1408 extends above the base plate 1410 in the vertical direction VD and an uppermost segment of the bar 1408 in the vertical direction VD lies in the same, or substantially the same, horizontal plane as the frame arch 1420.

In the illustrative embodiment, a U-shaped bar 1416 is coupled to the base plate 1410 and the frame arch 1430 and arranged in abutment with an interior face 1436 of the frame arch 1430. The bar 1416 is arranged to extend along the lateral end 1405 of the body 1402 rearward in the longitudinal direction LD to the extension arm 1404. The bar 1416 extends above the base plate 1410 in the vertical direction VD and an uppermost segment of the bar 1416 in the vertical direction VD lies in the same, or substantially the same, horizontal plane as the frame arch 1430.

The illustrative weldment brace 1320 extends rearward in the longitudinal direction LD from the faceplate 1440 to the body 1402 of the base plate 1410. In at least some embodiments, at least a portion of the weldment brace 1320 is arranged in direct contact with an underside (not shown) of the base plate 1410 such that the base plate 1410 is at least partially supported by the weldment brace 1320. The weldment brace 1320 includes a notch 1424 that at least partially receives a forward support bar 1428.

The illustrative weldment brace 1330 extends rearward in the longitudinal direction LD from the faceplate 1440 to the body 1402 of the base plate 1410. In at least some embodiments, at least a portion of the weldment brace 1330 is arranged in direct contact with the underside of the base plate 1410 such that the base plate 1410 is at least partially supported by the weldment brace 1330. The weldment brace 1330 includes a notch 1438 that at least partially receives the forward support bar 1428. When the forward support bar 1428 is received by the notches 1424, 1438 as shown in FIG. 14, the forward support bar 1428 contacts a forward edge of the base plate 1410 and extends all the way, or substantially all the way, across the forward edge of the base plate 1410 in the lateral direction LD'.

Weldment tabs 1442, 1444 are illustratively directly affixed to the interior side 1344 of the faceplate 1440 such that the weldment tabs 1442, 1444 extend rearward away from the faceplate 1440 in the longitudinal direction LD. The weldment tabs 1442, 1444 are formed to include respective apertures 1442A, 1444A. The weldment tabs 1442, 1444 are spaced from one another in the vertical direction VD and arranged at least partially outward of the frame arch 1420 in the lateral direction LD'.

Weldment tabs 1446, 1448 are illustratively directly affixed to the interior side 1344 of the faceplate 1440 such that the weldment tabs 1446, 1448 extend rearward away from the faceplate 1440 in the longitudinal direction LD. The weldment tabs 1446, 1448 are formed to include respective apertures (only aperture 1446A is shown). The weldment tabs 1446, 1448 are spaced from one another in the vertical direction VD and arranged at least partially outward of the frame arch 1430 in the lateral direction LD'.

A rear support bar 1458 is illustratively coupled to and extends across the extension arms 1404, 1406 of the base plate 1410 in the lateral direction LD'. In some embodiments, the rear support bar 1458 extends all the way, or substantially all the way, across the base plate 1410 in the lateral direction LD'. Additionally, in some embodiments, the rear support bar 1458 is coupled to the extension arms 1404, 1406 such that the rear support bar 1458 at least partially encloses the central cavity 710. In any case, in the illustrative embodiment, an endplate 1460 is coupled to the rear support bar 1458 such that the endplate 1460 extends all the way, or substantially all the way, across the rear support bar 1458 in the lateral direction LD'. In some embodiments, each of the front support bar 1428, the rear support bar 1458, and the endplate 1460 contacts the opposing interior faces 1426, 1436 of the corresponding frame arches 1420, 1430.

In the illustrative embodiment, a reinforcement strip 1470 (e.g., a bar, rod, or the like) is directly coupled to the body 1402 of the base plate 1410 along the forward edge thereof. In some embodiments, the reinforcement strip 1470 is coupled to the forward support bar 1428 such that the reinforcement strip 1470 is aligned with, or substantially aligned with, the forward support bar 1428 in the longitudinal direction LD. Additionally, in some embodiments, the reinforcement strip 1470 contacts the opposing interior faces 1426, 1436 of the corresponding frame arches 1420, 1430.

In the illustrative embodiment, a reinforcement beam 1480 is directly coupled to the body 1402 of the base plate 1410 and arranged rearward of the reinforcement strip 1470 in the longitudinal direction LD. The illustrative reinforcement beam 1480 includes a central body 1482 extending in the lateral direction LD' between opposite triangular ends (only end 1484 is shown). The central body 1482 has a rectangular or substantially rectangular cross-section and each of the triangular ends has a triangular or substantially triangular cross-section. In some embodiments, each of the triangular ends of the reinforcement beam 1480 contacts the opposing interior faces 1426, 1436 of the corresponding frame arches 1420, 1430.

In the illustrative embodiment, triangular reinforcements (only reinforcement 1486 is shown) are coupled to the base plate 1410. In some embodiments, the reinforcement 1486 is directly coupled to the body 1402 and arranged rearward of the triangular end 1484 of the reinforcement beam 1480 in the longitudinal direction LD. In such embodiments, the reinforcement 1486 contacts the interior face 1436 of the frame arch 1430. In some embodiments, the other triangular reinforcement is arranged rearward of the corresponding triangular end of the reinforcement beam 1480 in the longitudinal direction LD and contacts the interior face 1426 of the frame arch 1420.

In the illustrative embodiment, reinforcement rods (only reinforcement rod 1490 is shown) are coupled to the base plate 1410. More specifically, the reinforcement rod 1490 is coupled to the extension arm 1404 and the reinforcement beam 1480 such that the reinforcement rod 1490 extends rearward away from the reinforcement beam 1480 over the extension arm 1404 in the longitudinal direction LD. The reinforcement rod 1490 is illustratively arranged perpendicular to the reinforcement beam 1480. The other reinforcement rod is coupled to the extension arm 1406 and the reinforcement beam 1480 such that the other reinforcement rod extends rearward away from the reinforcement beam 1480 over the extension arm 1406 in the longitudinal direction LD. The other reinforcement rod is illustratively arranged perpendicular to the reinforcement beam 1480.

Referring now to FIG. 15, the swing arm assembly 1310 of the rear suspension assembly 340A illustratively includes a swing arm structure 1510 and a disc 1560 coupled to the swing arm structure 1510. At one end 1512 thereof, the swing arm structure 1510 is formed to include a pair of pivot hubs 1514A, 1514B. The disc 1560 is disposed at or proximate another end 1516 of the swing arm structure 1510 that is opposite the one end 1512. One of the rear wheels 214 is rotatably mounted on the disc 1560 in use of the vehicle 200. In some embodiments, the swing arm structure 1510 and the disc 1560 may be integrally formed as a single structure.

The pivot hubs 1514A, 1514B are arranged to be positioned in the respective hinge elements or hinge blocks 1502, 1504. When the pivot hub 1514A is positioned in the hinge element 1502, a pivot pin 1518 may be received by the hub 1514A and the hinge element 1502 to at least partially establish the hinge joint 1302. Similarly, when the pivot hub 1514B is positioned in the hinge element 1504, a pivot pin 1520 may be received by the hub 1514B and the hinge element 1504 to at least partially establish the hinge joint 1304.

In some embodiments, each of the pivot pins 1518, 1520 may be surrounded by, and/or retained by, a pair of thrust washers 1522. Additionally, in some embodiments, each of the hinge elements 1502, 1504 may be coupled to and/or supported by a spacer mount structure 1524. The spacer mount structure 1524 may include, or otherwise be embodied as, a mounting structure (e.g., a plate, bracket, or block) that supports each of the hinge elements 1502, 1504 and includes a vertical mount portion and a horizontal mount portion. The spacer mount structure 1524 may be interposed between each of the hinge elements 1502, 1504 and the interior side 1344 of the faceplate 1440, at least in some embodiments.

In the illustrative embodiment, the swing arm structure 1510 is formed to include a bore 1530 that is disposed between the pivot hubs 1514A, 1514B and the disc 1560. The swing arm structure 1510 includes a web 1532 that surrounds the bore 1530 and is interconnected with the pivot hubs 1514A, 1514B. The web 1532 includes connection fingers 1534, 1536, 1538 and a link 1540 extending between the pivot hubs 1514A, 1514B. Each of the connection fingers 1534, 1536, 1538 extends from the bore 1530 to the link 1540 and is interconnected with the link 1540. A void 1542 is at least partially defined by the connection fingers 1534, 1536 and the link 1540 and a void 1544 is at least partially defined by the connection fingers 1536, 1538 and the link 1540. A slot 1546 is formed in the connection finger 1534 and a slot 1548 is formed in the connection finger 1538.

In the illustrative embodiment, the bore 1530 is sized to receive an air spring 1550 that is mountable to the rear suspension subframe assembly 330 (e.g., the base plate 1410) via an air spring mount plate 1552. In some embodiments, the air spring 1550 may be powered by pressurized air supplied by an electric pump or compressor. Further, in the illustrative embodiment, a helper spring 1554 is coupled between the swing arm structure 1510 and the rear suspension subframe assembly 330 (e.g., the base plate 1410) using one or more fasteners 1556 and one or more washers 1558. Like the air spring 1550, the helper spring 1554 may be powered by pressurized air supplied by an electric pump or compressor. In some embodiments, the air spring 1550 and the helper spring 1554 may serve as independent air suspension mechanisms of the suspension assembly 340A operable in concert with one another in use of the vehicle 200.

In some embodiments, a valve assembly 1562 includes at least one valve adapted to control the supply of pressurized air to at least one of the air spring 1550 and the helper spring 1554. In one example, the valve assembly 1562 is configured to regulate the supply of pressurized air to the air spring 1550 to selectively inflate the air spring 1550 (e.g., inflatable bellows thereof) and thereby adjust a height of the air spring 1550 and/or a rotational position of the swing arm structure 1510 about a rotational axis. In another example, the valve assembly 1562 is configured to regulate the supply of pressurized air to each of the springs 1550, 1554 to adjust their respective heights and/or vary the rotational position of the swing arm structure 1510 about the rotational axis accordingly.

In some embodiments, a control valve 1564 is adapted to control the supply of pressurized air to a control link 1566. In some embodiments, the control link 1566 includes, or is otherwise embodied as, a pneumatic cylinder, actuator, or the like. Additionally, in some embodiments, the control link 1566 is coupled between the swing arm structure 1510 and the rear suspension subframe assembly 330 (e.g., the base plate 1410), and the control valve 1564 is configured to regulate the supply of pressurized air to the control link 1566 to vary a length of the control link 1566 and/or vary the rotational position of the swing arm structure 1510 about the rotational axis.

In the illustrative embodiment, the rear suspension assembly 340A includes at least one shock absorber or coilover 1570 movably coupled to the swing arm assembly 1310 and the rear suspension subframe assembly 330. As best seen in FIG. 17, the shock absorber 1570 is coupled to the swing arm structure 1510 and the frame arch 1420. In some embodiments, the shock absorber 1570 is pivotally coupled to the swing arm structure 1510 and the frame arch 1420. In any case, when coupled to the swing arm structure 1510 and the frame arch 1420, the shock absorber 1570 is arranged inward of the frame arch 1420 in the lateral direction LD' (see FIG. 17).

In the illustrative embodiment, a braking device 1572 may be engaged or activated to selectively resist rotation of the disc 1560 and the wheel 214, at least in some embodiments. The braking device 1572 may include one or more brake pads 1574 adapted for frictional contact with the disc 1560.

As shown in FIG. 15, the illustrative vehicle 200 includes a variety of features in addition to the aforementioned devices, assemblies, and/or systems. Those features include, but are not limited to, the following: one or more fastener socket heads 1576; one or more nuts 1578; and a chassis brace 1590. The illustrative chassis brace 1590 is coupled to, and extends between, the weldment braces 1320, 1330.

As mentioned above, in some embodiments, the rear suspension assemblies 340A, 340B may be identical or substantially similar to one another. In such embodiments, corresponding components of the suspension assemblies 340A, 340B may be coupled to corresponding structures of the rear suspension subframe assembly 330. In one example, the shock absorber 1570 of the rear suspension assembly 340A is coupled to the frame arch 1420 and a shock absorber or coilover 1770 of the rear suspension assembly 340B is coupled to the frame arch 1430.

Figure 16:
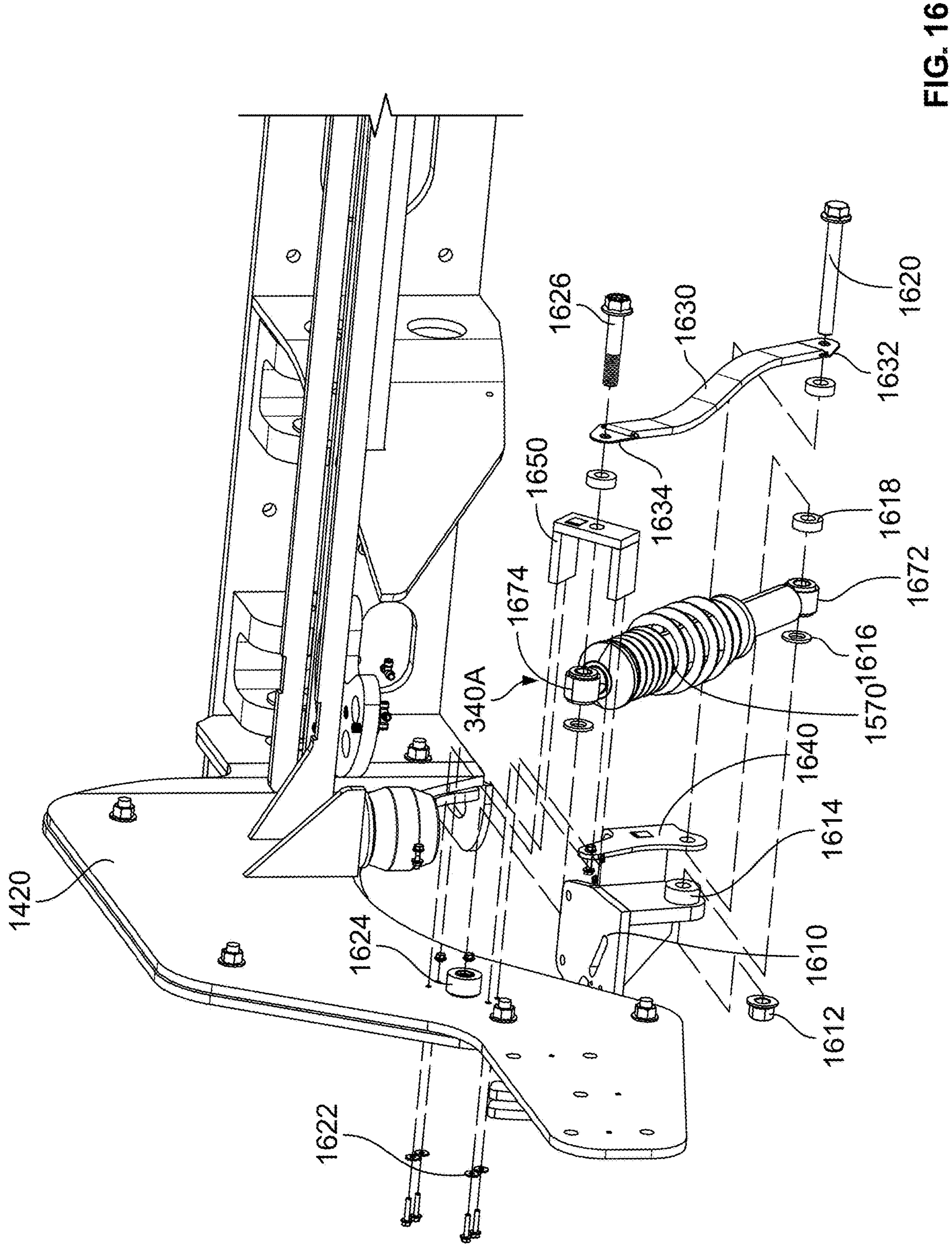
FIG. 16 is a partially exploded perspective view of the one rear suspension assembly shown in FIG. 15 depicting various components thereof with a swing arm assembly of the rear suspension assembly omitted for the sake of clarity.

Referring now to FIG. 16, the illustrative rear suspension assembly 340A includes a mount block 1610 adapted for interaction with the swing arm assembly 1310. In some embodiments, the mount block 1610 is configured for direct contact and/or connection with the swing arm structure 1510 and disposed proximate the disc 1560. An end 1672 of the shock absorber 1570 is coupled (e.g., pivotally coupled) to the mount block 1610 using one or more nuts 1612, one or more bearings or bearing elements 1614, one or more washers 1616, one or more spacers 1618, and one or more fasteners 1620. An end 1632 of a retaining lever 1630 is coupled (e.g., pivotally coupled) to the mount block 1610 using the one or more nuts 1612, the one or more bearings or bearing elements 1614, the one or more washers 1616, the shock absorber 1570, the one or more spacers 1618, a retaining plate 1640, and the one or more fasteners 1620.

In the illustrative embodiment, an end 1674 of the shock absorber 1570 arranged opposite the end 1672 is coupled (e.g., pivotally coupled) to the frame arch 1420 using one or more washers 1622 distinguishable from the washers 1616, one or more bearings or bearing elements 1624 distinguishable from the bearings 1614, the one or more washers 1616, a shock bracket 1650, the one or more spacers 1618, and one or more pins 1626. Additionally, in the illustrative embodiment, an end 1634 of the retaining lever 1630 arranged opposite the end 1632 is coupled (e.g., pivotally coupled) to the frame arch 1420 using the one or more washers 1622, the one or more bearings or bearing elements 1624, the one or more washers 1616, the shock absorber 1570, the shock bracket 1650, the one or more spacers 1618, and the one or more pins 1626.

Referring now to FIG. 17, using the illustrative rear suspension assembly 340A as an example, multiple structures thereof are arranged at least partially inward of the frame arch 1420 in the lateral direction LD'. In one example, the shock absorber 1570 is arranged partially inward of the frame arch 1420. In another example, the shock absorber 1570 and the retaining lever 1630 are arranged partially inward of the frame arch 1420.

As shown in FIG. 17, a central housing 1780 of the powertrain unit 380 is arranged midway or substantially midway in the lateral direction LD' between the rear suspension assemblies 340A, 340B. A cover 1710 is arranged between the shock absorber 1570 of the rear suspension assembly 340A and the central housing 1780 in the lateral direction LD'. In the illustrative embodiment, the cover 1710 is coupled to a strain relief plate 1720 that is arranged above the cover 1710 in the vertical direction VD such that the strain relief plate 1720 is at least partially covered by the cover 1710. A cover 1730 is arranged between the shock absorber 1770 of the rear suspension assembly 340B and the central housing 1780 in the lateral direction LD'. In some embodiments, the cover 1730 may be coupled to the strain relief plate 1720 such that the strain relief plate 1720 is at least partially covered by the cover 1730.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A land vehicle comprising:

a chassis extending in a longitudinal direction that includes a rear suspension subframe assembly having a base plate, a first frame arch coupled to the base plate at one lateral end thereof, a second frame arch coupled to the base plate at another lateral end thereof opposite the one lateral end, and a faceplate coupled to the first and second frame arches at forward ends thereof;

a pair of rear wheels supported by the rear suspension subframe assembly; and a pair of rear suspension assemblies each coupled to one of the pair of rear wheels and the rear suspension subframe assembly to support the pair of rear wheels for rotation relative to the chassis in use of the land vehicle, wherein:

one of the rear suspension assemblies is mounted to the rear suspension subframe assembly adjacent the first frame arch such that the one of the rear suspension assemblies is arranged at least partially inward of the first frame arch in a lateral direction perpendicular to the longitudinal direction, and the other of the rear suspension assemblies is mounted to the rear suspension subframe assembly adjacent the second frame arch such that the other of the rear suspension assemblies is arranged at least partially inward of the second frame arch in the lateral direction.

2. The land vehicle of claim 1, wherein:

the one rear suspension assembly includes a swing arm assembly movably coupled to the rear suspension subframe assembly, and the swing arm assembly includes a disc on which one of the pair of rear wheels is rotatably mounted.

3. The land vehicle of claim 2, wherein the one rear suspension assembly includes at least one shock absorber movably coupled to the swing arm assembly and the rear suspension subframe assembly.

4. The land vehicle of claim 3, wherein the at least one shock absorber of the one rear suspension assembly is arranged inward of the first frame arch in the lateral direction.

5. The land vehicle of claim 4, wherein:

the other rear suspension assembly includes another swing arm assembly movably coupled to the rear suspension subframe assembly, the another swing arm assembly includes another disc on which the other of the pair of rear wheels is rotatably mounted, the other rear suspension assembly includes at least one shock absorber movably coupled to the another swing arm assembly and the rear suspension subframe assembly, and the at least one shock absorber of the other rear suspension assembly is arranged inward of the second frame arch in the lateral direction.

6. The land vehicle of claim 1, wherein the base plate is formed to include a central cavity in which a plurality of drive units of the vehicle that are coupled to the pair of rear wheels is at least partially positioned.

7. The land vehicle of claim 1, wherein the one rear suspension assembly includes a swing arm assembly movably coupled to the faceplate.

8. The land vehicle of claim 7, wherein the swing arm assembly is formed to include a pair of pivot hubs formed at one end thereof.

9. The land vehicle of claim 8, wherein the pair of pivot hubs are positioned in respective hinge blocks affixed to the faceplate.

10. A land vehicle comprising:

a chassis extending in a longitudinal direction that includes a rear suspension subframe assembly;

a pair of rear wheels supported by the rear suspension subframe assembly; and a pair of rear suspension assemblies each coupled to one of the pair of rear wheels and the rear suspension subframe assembly to support the pair of rear wheels for rotation relative to the chassis in use of the land vehicle, wherein:

one of the rear suspension assemblies is mounted to the rear suspension subframe assembly such that the one of the rear suspension assemblies is arranged at least partially inward of the rear suspension subframe assembly in a lateral direction perpendicular to the longitudinal direction, the other of the rear suspension assemblies is mounted to the rear suspension subframe assembly such that the other of the rear suspension assemblies is arranged at least partially inward of the rear suspension subframe assembly in the lateral direction, the one of the rear suspension assemblies includes a swing arm assembly pivotally coupled to the rear suspension subframe assembly, and the swing arm assembly includes a pair of pivot hubs and a disc on which one of the pair of rear wheels is rotatably mounted.

11. The land vehicle of claim 10, wherein the pair of pivot hubs are formed at one end of the swing arm assembly and the disc is formed at another end of the swing arm assembly.

12. The land vehicle of claim 10, wherein the swing arm assembly includes a bore disposed between the pair of pivot hubs and the disc.

13. The land vehicle of claim 12, wherein the one rear suspension assembly includes an air spring arranged in the bore.

14. The land vehicle of claim 10, wherein the one rear suspension assembly includes at least one shock absorber arranged inward of a frame arch of the rear suspension subframe assembly in the lateral direction.

15. A land vehicle comprising:

a chassis extending in a longitudinal direction that includes a rear suspension subframe assembly;

a pair of rear wheels supported by the rear suspension subframe assembly; and a pair of rear suspension assemblies each coupled to one of the pair of rear wheels and the rear suspension subframe assembly to support the pair of rear wheels for rotation relative to the chassis in use of the land vehicle, wherein:

each of the pair of rear suspension assemblies includes a swing arm assembly pivotally coupled to the rear suspension subframe assembly, each swing arm assembly includes a disc on which one of the pair of rear wheels is rotatably mounted, and each of the pair of rear suspension assemblies includes an air spring arranged in a bore formed in the swing arm assembly.

16. The land vehicle of claim 15, wherein each swing assembly includes at least one shock absorber movably coupled to the swing arm assembly and the rear suspension subframe assembly.

* * * * *